US012395674B2

United States Patent
Xiu et al.

(10) Patent No.: US 12,395,674 B2
(45) Date of Patent: Aug. 19, 2025

(54) METHODS AND APPARATUS FOR REDUCING THE CODING LATENCY OF DECODER-SIDE MOTION REFINEMENT

(71) Applicant: INTERDIGITAL VC HOLDINGS, INC., Wilmington, DE (US)

(72) Inventors: Xiaoyu Xiu, San Diego, CA (US); Yuwen He, San Diego, CA (US); Yan Ye, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/623,846

(22) Filed: Apr. 1, 2024

(65) Prior Publication Data
US 2024/0244253 A1 Jul. 18, 2024

Related U.S. Application Data

(63) Continuation of application No. 18/075,169, filed on Dec. 5, 2022, now Pat. No. 11,973,974, which is a
(Continued)

(51) Int. Cl.
*H04N 19/176* (2014.01)
*H04N 19/513* (2014.01)
(Continued)

(52) U.S. Cl.
CPC ......... *H04N 19/521* (2014.11); *H04N 19/176* (2014.11); *H04N 19/577* (2014.11); *H04N 19/86* (2014.11)

(58) Field of Classification Search
CPC .... H04N 19/176; H04N 19/436; H04N 19/52; H04N 19/521; H04N 19/56; H04N 19/577; H04N 19/86
See application file for complete search history.

(56) References Cited

U.S. PATENT DOCUMENTS

| 2014/0341297 A1 | 11/2014 | Chien |
| 2015/0085935 A1 | 3/2015 | Chen |

(Continued)

FOREIGN PATENT DOCUMENTS

| CN | 105075259 A | 11/2015 |
| WO | 2014160943 A1 | 10/2014 |

OTHER PUBLICATIONS

ITU-T Recommendation H.264 and ISO/IEC/MPEG-4 part 10, "Advanced Video Coding for Generic Audiovisual Services", Series H: Audiovisual and Multimedia Systems, Infrastructure of audiovisual services—Coding of moving video, Nov. 2007, 564 pages.
(Continued)

*Primary Examiner* — Jessica M Prince
(74) *Attorney, Agent, or Firm* — Klintworth & Rozenblat LLP

(57) ABSTRACT

Embodiments of video coding systems and methods are described for reducing coding latency introduced by decoder-side motion vector refinement (DMVR). In one example, two non-refined motion vectors are identified for coding of a first block of samples (e.g. a first coding unit) using bi-prediction. One or both of the non-refined motion vectors are used to predict motion information for a second block of samples (e.g. a second coding unit). The two non-refined motion vectors are refined using DMVR, and the refined motion vectors are used to generate a prediction signal of the first block of samples. Such embodiments allow the second block of samples to be coded substantially in parallel with the first block without waiting for completion of DMVR on the first block. In additional embodiments, optical-flow-based techniques are described for motion vector refinement.

16 Claims, 18 Drawing Sheets

Related U.S. Application Data continuation of application No. 17/256,155, filed as application No. PCT/US2019/038300 on Jun. 20, 2019, now Pat. No. 11,546,628.

(60) Provisional application No. 62/690,507, filed on Jun. 27, 2018.

(51) Int. Cl.
*H04N 19/577* (2014.01)
*H04N 19/86* (2014.01)

(56) References Cited

U.S. PATENT DOCUMENTS

| | | | |
|---|---|---|---|
| 2016/0219278 A1 | 7/2016 | Chen | |
| 2018/0041769 A1 | 2/2018 | Chuang | |
| 2018/0192071 A1* | 7/2018 | Chuang | H04N 19/44 |
| 2019/0222837 A1 | 7/2019 | Lee | |
| 2020/0012863 A1* | 1/2020 | Skupin | H04N 19/172 |
| 2020/0137413 A1* | 4/2020 | Esenlik | H04N 19/436 |
| 2020/0280735 A1* | 9/2020 | Lim | H04N 19/176 |
| 2020/0413040 A1 | 12/2020 | Lim | |
| 2021/0136398 A1* | 5/2021 | Robert | H04N 19/436 |
| 2022/0174306 A1* | 6/2022 | Robert | H04N 19/105 |
| 2023/0188745 A1* | 6/2023 | Chuang | H04N 19/44 |
| | | | 375/240.16 |

OTHER PUBLICATIONS

Bross, et al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.

Alshina, E., et. al., "Known Tools Performance Investigation for Next Generation Video Coding". ITU—Telecommunications Standardization Sector, SG16/Q6, Video Coding Experts Group (VCEG), Jun. 2015, VCEG-AZ05, 7 pages.

International Search Report and Written Opinion of the International Searching Authority for PCT/US2019/038300 mailed Sep. 16, 2019 (15 pages).

Chen, Jianle, et. al., "Algorithm Description of Joint Exploration Test Model 7 (JEM7)". Joint Video Exploration Team (JVET) of ITU-T SG 16 WP 3 and ISO/IEC JTC 1/SC 29/WG 11, JVET-G1001-v1, Jul. 13-21, 2017, 48 pages.

Nandan, N., et. al., "Motion Vector Dependent Filter Strength Computation for High Performance H.264 De-Blocking Loop Filter". International Conference on Communication and Signal Processing, IEEE, Apr. 3, 2014, pp. 404-408.

Xiu, X. et. al., "CE9-related: Addressing the Decoding Latency Issue For Decoder-Side Motion Vector Refinement (DMVR)". Motion Picture Expert Group or ISO/IEC JTC1/SC29/WG11, No. m43284, Jul. 3, 2018, 4 pages.

Segall, Andrew, et. al. "Joint Call For Proposals On Video Compression With Capability Beyond HEVC". Joint Video Exploration Team (JVET) of ITU-T SG 16 WP 3 and ISO/IEC JTC 1/SC 29/WG 11, JVET-H1002-v6, Oct. 18-24, 2017, 27 pages.

Bross, Benjamin, "Versatile Video Coding (Draft 1)". Joint Video Experts Team (JVET) of ITU-T SG 16 WP 3 and ISO/IEC JTC 1/SC 29/WG 11 , JVET-J1001-v2, Apr. 10-20, 2018, 40 pages.

International Preliminary Report on Patentability for PCT/US2019/038300 issued Dec. 29, 2020 (11 pages).

SMPTE Standard "VC-1 Compressed Video Bitstream Format and Decoding Process". The society of motion picture and television engineers, SMPTE 421M, 2006, (493 pages).

Chen, Jianle, et. al., "Coding Tools Investigation for Next Generation Video Coding". ITU-Telecommunication Standardization Sector, Study Group 16, Contribution 806, COM16-C806, Jan. 2015, pp. 1-7.

Karczewicz, M., et. al., "Report of AHG1 On Coding Efficiency Improvements". ITU—Telecommunications Standardization Sector, Video Coding Experts Group (VCEG), SG16/Q6, VCEG-AZ01, Jun. 2015, 2 pages.

Ohm, Jens-Rainer., et. al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.

Tokumichi , M. "High Efficiency Video Coding Technique HEVC/H.265 and its Application," Ed. 1, Ohmusha, Ltd., pp. 125 to 136, Feb. 2013, ISBN: 978-4-274-21329-8 (18 pages).

"H. 264/AVC Textbook Revised 3rd Edition (Impress Standard Textbook Series)" supervised by Okubo Sakae, Ed. 1, Impress R&D Corporation, Jan. 1, 2009, pp. 144 to 148, ISBN: 978-4-8443-2664-9 (13 pages).

Japanese Official Notice of Rejection and English translation thereof for Japanese Application No. 2020-572893 mailed on Jun. 13, 2022.

Sullivan, G. J., et. al., "Overview of the High Efficiency Video Coding (HEVC) Standard". IEEE Transaction on Circuits and Systems for Video Technology, 2012 (19 pages).

\* cited by examiner

METHODS AND APPARATUS FOR REDUCING THE CODING LATENCY OF DECODER-SIDE MOTION REFINEMENT

CROSS-REFERENCE TO RELATED APPLICATIONS

The present application is a continuation of U.S. patent application Ser. No. 18/075,169, filed Dec. 5, 2022, which is a continuation of U.S. patent application Ser. No. 17/256,155, filed Dec. 24, 2020, which is a national stage application under 35 U.S.C. 371 of International Application No. PCT/US2019/038300, entitled "Methods and Apparatus for Reducing the Coding Latency of Decoder-Side Motion Refinement," filed on Jun. 20, 2019, which claims benefit under 35 U.S.C. § 119(e) from U.S. Provisional Patent Application No. 62/690,507, filed Jun. 27, 2018, entitled "Methods and Apparatus for Reducing the Coding Latency of Decoder-Side Motion Refinement," which is incorporated herein by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013 and offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. A Joint Video Exploration Team (JVET) was formed in October 2015 by ITU-T VECG and ISO/IEC MPEG to begin significant study of advanced technologies that could enable substantial enhancement of coding efficiency. Reference software called joint exploration model (JEM) was maintained by the JVET by integrating several additional coding tools on top of the HEVC test model (HM).

In October 2017, a joint call for proposals (CfP) on video compression with capability beyond HEVC was issued by ITU-T and ISO/IEC. In Apr. 2018, 23 CfP responses were received and evaluated at the 10th JVET meeting, with demonstrating compression efficiency gain over the HEVC around 40%. Based on such evaluation results, the JVET launched a new project to develop the new generation video coding standard called Versatile Video Coding (VVC). In the same month, a reference software codebase, called VVC test model (VTM), was established for demonstrating a reference implementation of the WC standard. For the initial VTM-1.0, most of the coding modules, including intra prediction, inter prediction, transform/inverse transform and quantization/de-quantization, and in-loop filters follow the existing HEVC design, except that a multi-type tree-based block partitioning structure is used in the VTM. Meanwhile, to facilitate the assessment of new coding tools, another reference software base called benchmark set (BMS) was also generated. In the BMS codebase, a list of coding tools inherited from the JEM, which provides higher coding efficiency and moderate implementation complexity, are included on top of the VTM and used as the benchmark when evaluating similar coding technologies during the VVC standardization process. JEM coding tools integrated in BMS-1.0 include 65 angular intra prediction directions, modified coefficient coding, advanced multiple transform (AMT)+4×4 non-separable secondary transform (NSST), affine motion model, generalized adaptive loop filter (GALF), advanced temporal motion vector prediction (ATMVP), adaptive motion vector precision, decoder-side motion vector refinement (DMVR) and LM chroma mode.

SUMMARY

Some embodiments include methods that are used in video encoding and decoding (collectively "coding"). In some embodiments, of a block-based video coding method includes: at a first block, refining a first non-refined motion vector and a second non-refined motion vector to generate a first refined motion vector and a second refined motion vector; using one or both of the first non-refined motion vector and the second non-refined motion vector, predicting motion information of a second block, the second block being a spatial neighbor of the first block; and predicting the first block with bi-prediction using the first refined motion vector and the second refined motion vector.

In an example of a video coding method, a first non-refined motion vector and a second non-refined motion vector associated with a first block are identified. Motion information of a second block neighboring the first block is predicted using one or both of the first non-refined motion vector and the second non-refined motion vector. The first non-refined motion vector and the second non-refined motion vector are refined, e.g. using decoder-side motion vector refinement (DMVR). The refined motion vectors are used to generate a first refined motion vector and a second refined motion vector, which may be used for bi-prediction of the first block. The use of the non-refined motion vector(s) to predict motion information of the second block may be performed using one or more techniques such as spatial advanced motion vector prediction (AMVP), temporal motion vector prediction (TMVP), advanced temporal motion vector prediction (TMVP), and using the non-refined motion vector(s) as spatial merge candidates. In the case of spatial prediction, the second block may be spatial neighbor of the first block; in the case of temporal prediction, the second block may be a collocated block in a subsequently-coded picture. In some embodiments, deblocking filter strength for the first block is determined based at least in part on the first non-refined motion vector and the second non-refined motion vector.

In another example of a video coding method, a first non-refined motion vector and a second non-refined motion vector associated with a first block are identified. The first non-refined motion vector and the second non-refined motion vector are refined to generate a first refined motion vector and a second refined motion vector, e.g. using DMVR. Motion information of a second block is predicted using either spatial motion prediction or temporal motion prediction, wherein (i) if spatial motion prediction is used, one or both of the first non-refined motion vector and the second non-refined motion vector are used to predict the motion information, and (ii) if temporal motion prediction is used, one or both of the first refined motion vector and the second refined motion vector are used to predict the motion information.

In another example of a video coding method, at least one predictor is selected for predicting motion information of a current block. The selection is made from among a set of available predictors, where the available predictors include (i) at least one non-refined motion vector from a spatially neighboring block of the current block and (ii) at least one refined motion vector from a collocated block of the current block.

In another example of a video coding method, at least two non-overlapping regions in a slice are determined. A first non-refined motion vector and a second non-refined motion vector associated with a first block in the first region are identified. The first non-refined motion vector and the second non-refined motion vector are refined to generate a first refined motion vector and a second refined motion vector. In response to a determination that motion information of a second block neighboring the first block is predicted using motion information of the first block, the motion information of the second block is predicted (i) using one or both of the first non-refined motion vector and the second non-refined motion vector if the first block is not on the bottom edge or the right edge of the first region and (ii) using one or both of the first refined motion vector and the second refined motion vector if the first block is on a bottom edge or a right edge of the first region.

In another example of a video coding method, at least two non-overlapping regions in a slice are determined. A first non-refined motion vector and a second non-refined motion vector associated with a first block in the first region are identified. The first non-refined motion vector and the second non-refined motion vector are refined to generate a first refined motion vector and a second refined motion vector. In response to a determination that motion information of a second block neighboring the first block is predicted using motion information of the first block, the motion information of the second block is predicted (i) using one or both of the first non-refined motion vector and the second non-refined motion vector if the second block is in the first region and (ii) using one or both of the first refined motion vector and the second refined motion vector if the second block is not in the first region.

In another example of a video coding method, at least two non-overlapping regions in a slice are determined. A first non-refined motion vector and a second non-refined motion vector associated with a first block in the first region are identified. The first non-refined motion vector and the second non-refined motion vector are refined to generate a first refined motion vector and a second refined motion vector. Motion information of a second block is predicted using either spatial motion prediction or temporal motion prediction, wherein (i) if the first block is not on the bottom edge or the right edge of the first region, and if spatial motion prediction is used, one or both of the first non-refined motion vector and the second non-refined motion vector are used to predict the motion information, and (ii) if the first block is on the bottom edge or the right edge of the first region, or if temporal motion prediction is used, one or both of the first refined motion vector and the second refined motion vector are used to predict the motion information.

In another example of a video coding method, at least two non-overlapping regions are defined in a slice. A set of available predictors is determined for prediction of motion information of a current block in a first region, wherein the set of available predictors is constrained not to include motion information of any block in a second region different from the first region.

Some embodiments relate to methods for refining motion vectors. In one example, a first non-refined motion vector and a second non-refined motion vector are determining for a current block. A first prediction $I^{(0)}$ is generated using the first non-refined motion vector and a second prediction $I^{(1)}$ is generated using the second non-refined motion vector. An optical flow model is used to determine a motion refinement $(v_x^*, v_y^*)$ for the current block. The first non-refined motion vector and a second non-refined motion vector are refined using the motion refinement to generate a first refined motion vector and a second refined motion vector. The current block is predicted with bi-prediction using the first refined motion vector and the second refined motion vector.

In another example of a video coding method, a first non-refined motion vector and a second non-refined motion vector are determining for a current block. A first prediction $I^{(0)}$ is generated using the first non-refined motion vector and a second prediction $I^{(1)}$ is generated using the second non-refined motion vector. A motion refinement $(v_x^*, v_y^*)$ is determined for the current block, where $$(v_x^*, v_y^*) = \underset{(v_x, v_y)}{\mathrm{argmin}} \sum_{(i,j) \in \theta} \Delta^2(i, j)$$

where $\theta$ is a set of coordinates of all samples within the current block, and where $$\Delta(x, y) = I^{(0)}(x, y) - I^{(1)}(x, y) + v_x \left( \tau_1 \frac{\partial I^{(1)}(x, y)}{\partial x} + \tau_0 \frac{\partial I^{(0)}(x, y)}{\partial x} \right) + v_y \left( \tau_1 \frac{\partial I^{(1)}(x, y)}{\partial y} + \tau_0 \frac{\partial I^{(0)}(x, y)}{\partial y} \right).$$

The first non-refined motion vector and second non-refined motion vector are refined using the motion refinement to generate a first refined motion vector and a second refined motion vector. The current block is predicted with bi-prediction using the first refined motion vector and the second refined motion vector.

In another example of a video coding method, a first motion vector and a second motion vector are determined for a current block. The first motion vector and the second motion vector are refined by iteratively performing steps including the following:
  (a) generating a first prediction $P^0$ using the first motion vector and a second prediction $P^1$ using the second motion vector;
  (b) generating a bi-prediction template signal $P^{tmp}$ by averaging the first prediction $P^0$ and the second prediction $P^1$;
  (c) using an optical flow model to determine a first motion refinement $(\Delta x, \Delta y)^*_0$ to the first motion vector and a second motion refinement $(\Delta x, \Delta y)^*_1$ to the second motion vector based on the template signal $P^{tmp}$; and
  (d) refining the first motion vector using the first motion refinement $(\Delta x, \Delta y)^*_0$ and refining the second motion vector using the second motion refinement $(\Delta x, \Delta y)^*_1$.

Further embodiments include encoder and decoder (collectively "codec") systems configured to perform the methods described herein. Such systems may include a processor and a non-transitory computer storage medium storing instructions that are operative, when executed on the processor, to perform the methods described herein. Additional embodiments include non-transitory computer-readable media storing a video encoded using the methods described herein.

EXAMPLE NETWORKS FOR IMPLEMENTATION OF THE EMBODIMENTS

Figure 1A:
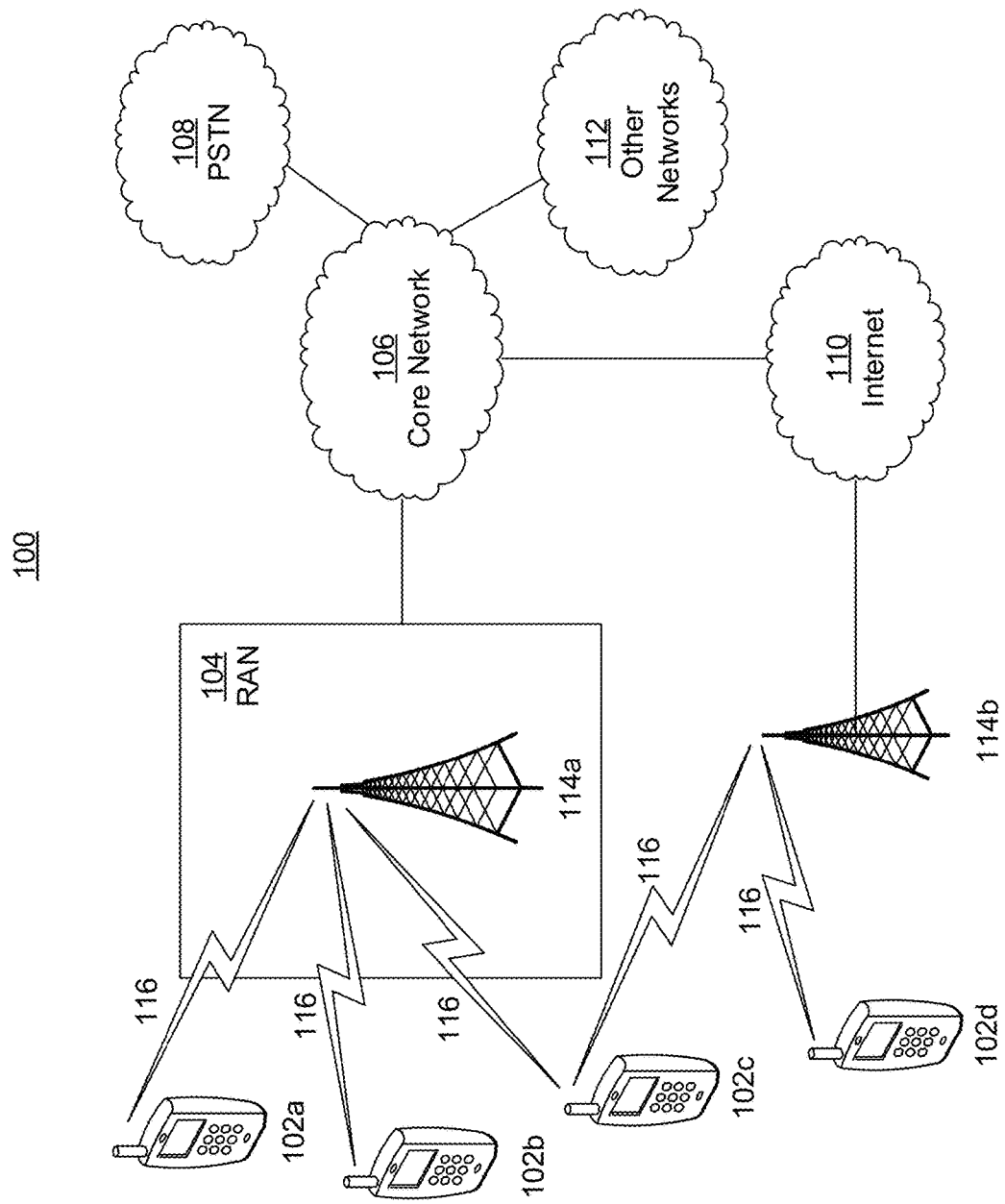
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
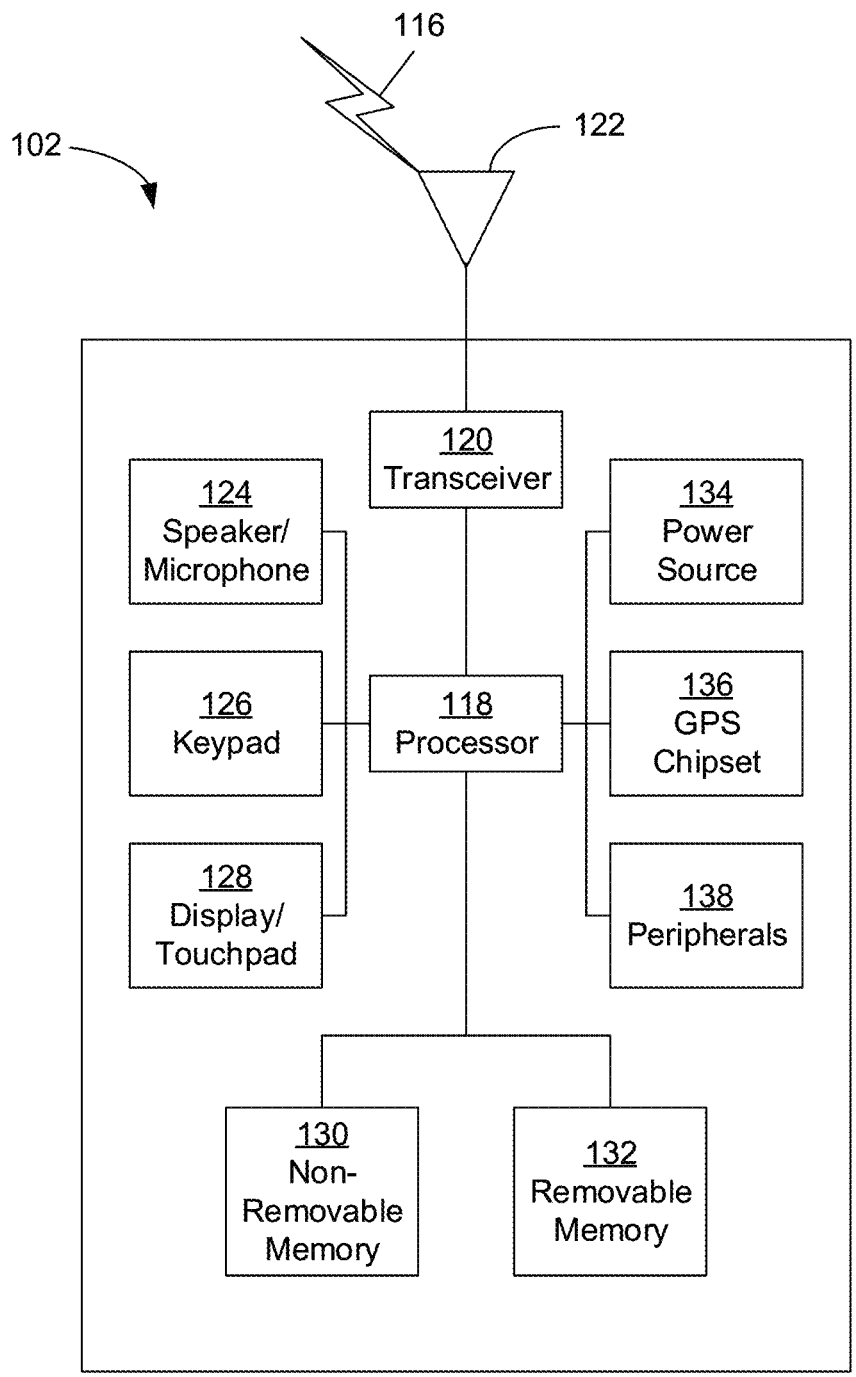
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Block-Based Video Coding.

Figure 2:
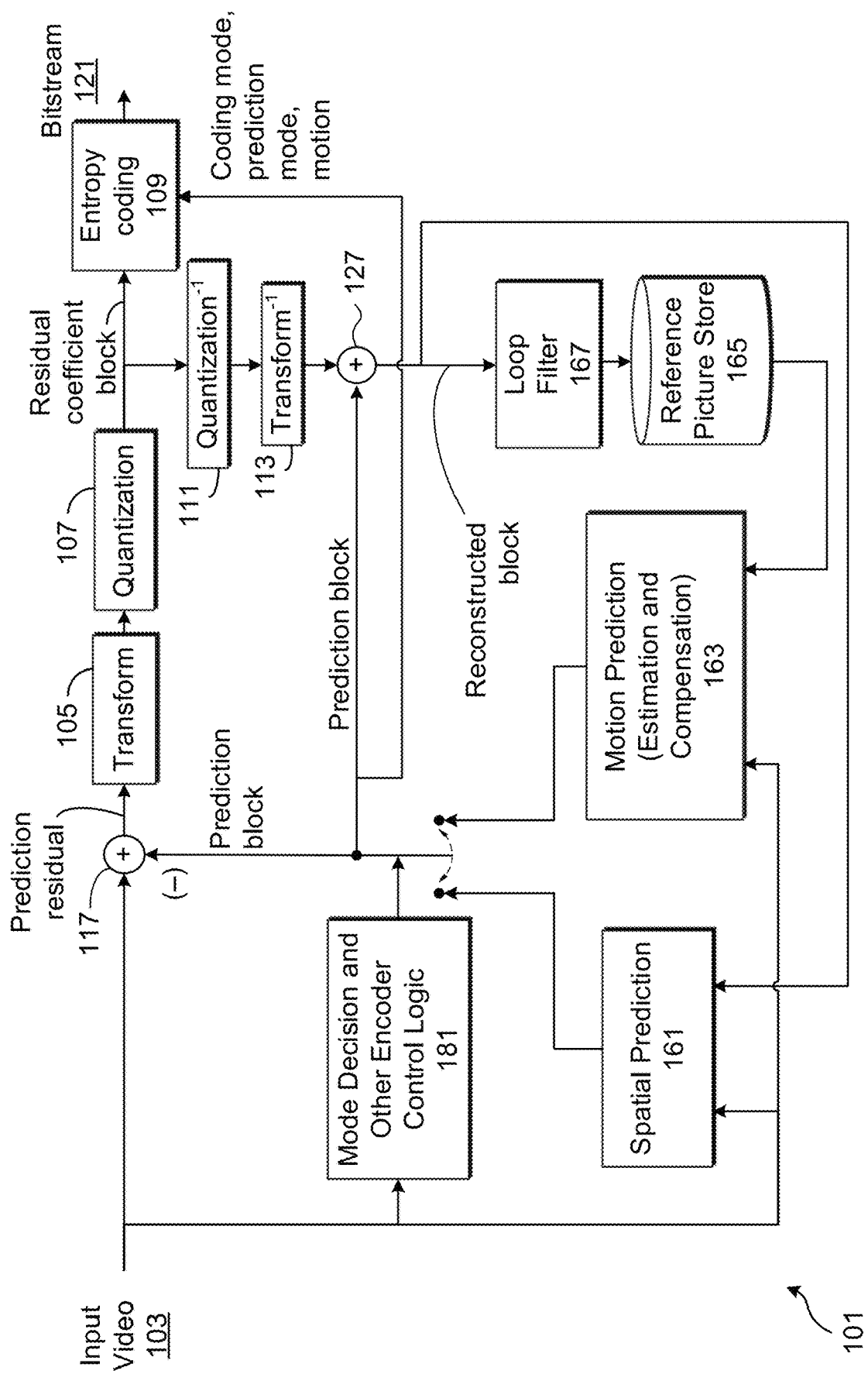
FIG. 2 is a functional block diagram of block-based video encoder, such as an encoder used for WC.
Figure 3:
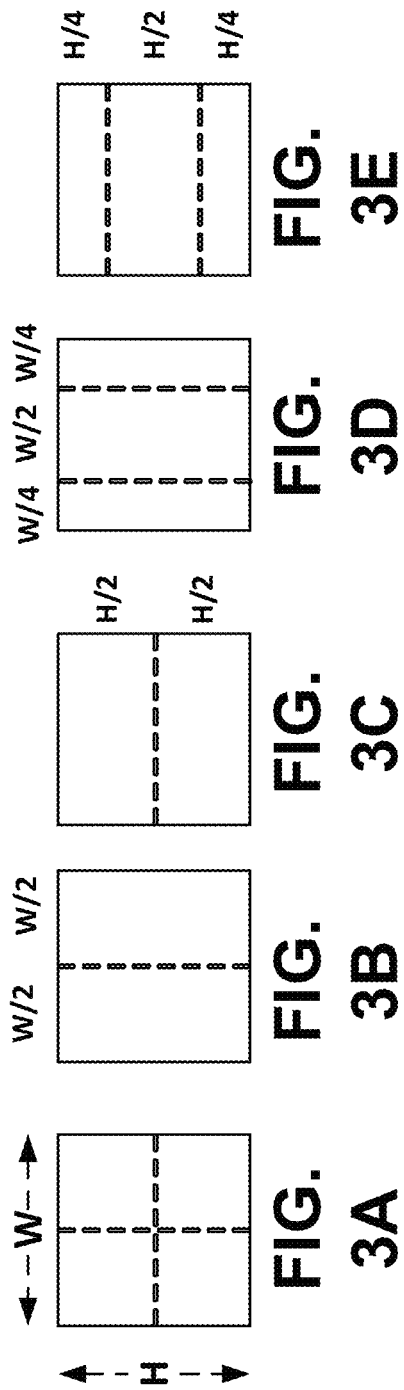
FIGS. 3A-3E illustrate block partitions in a multi-type tree structure: quaternary partition (FIG. 3A); vertical binary partition (FIG. 3B); horizontal binary partition (FIG. 3C); vertical ternary partition (FIG. 3D); horizontal ternary partition (FIG. 3E).

Like HEVC, VVC is built upon the block-based hybrid video coding framework. FIG. 2 is a functional block diagram of an example of a block-based hybrid video encoding system. The input video signal 103 is processed block by block. The blocks may be referred to as coding units (CUs). In VTM-1.0, a CU can be up to 128×128 pixels. However, as compared to HEVC, which partitions blocks only based on quad-trees, in VTM-1.0, a coding tree unit (CTU) may be split into CUs to adapt to varying local characteristics based on quad/binary/ternary-tree. Additionally, the concept of multiple partition unit type in HEVC may be removed, such that the separation of CU, prediction unit (PU) and transform unit (TU) is not used in the VVC; instead, each CU may be used as the basic unit for both prediction and transform without further partitions. In the multi-type tree structure, a CTU is firstly partitioned by a quad-tree structure. Then, each quad-tree leaf node can be further partitioned by a binary and ternary tree structure. As shown in FIGS. 3A-3E, there may be five splitting types: quaternary partitioning, horizontal binary partitioning, vertical binary partitioning, horizontal ternary partitioning, and vertical ternary partitioning.

In FIG. 2, spatial prediction (161) and/or temporal prediction (163) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already-coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, a reference picture index is additionally sent, which is used to identify from which reference picture in the reference picture store (165) the temporal prediction signal comes.

After spatial and/or temporal prediction, the mode decision block (181) in the encoder chooses the best prediction mode, for example based on the rate-distortion optimization method. The prediction block is then subtracted from the current video block (117), and the prediction residual is de-correlated using transform (105) and quantized (107). The quantized residual coefficients are inverse quantized (111) and inverse transformed (113) to form the reconstructed residual, which is then added back to the prediction block (127) to form the reconstructed signal of the CU. Further in-loop filtering, such as deblocking filter, may be applied (167) on the reconstructed CU before it is put in the reference picture store (165) and used to code future video blocks. To form the output video bit-stream 121, the coding mode (inter or intra), prediction mode information, motion information, and quantized residual coefficients are all sent to the entropy coding unit (109) to be further compressed and packed to form the bit-stream.

Figure 4:
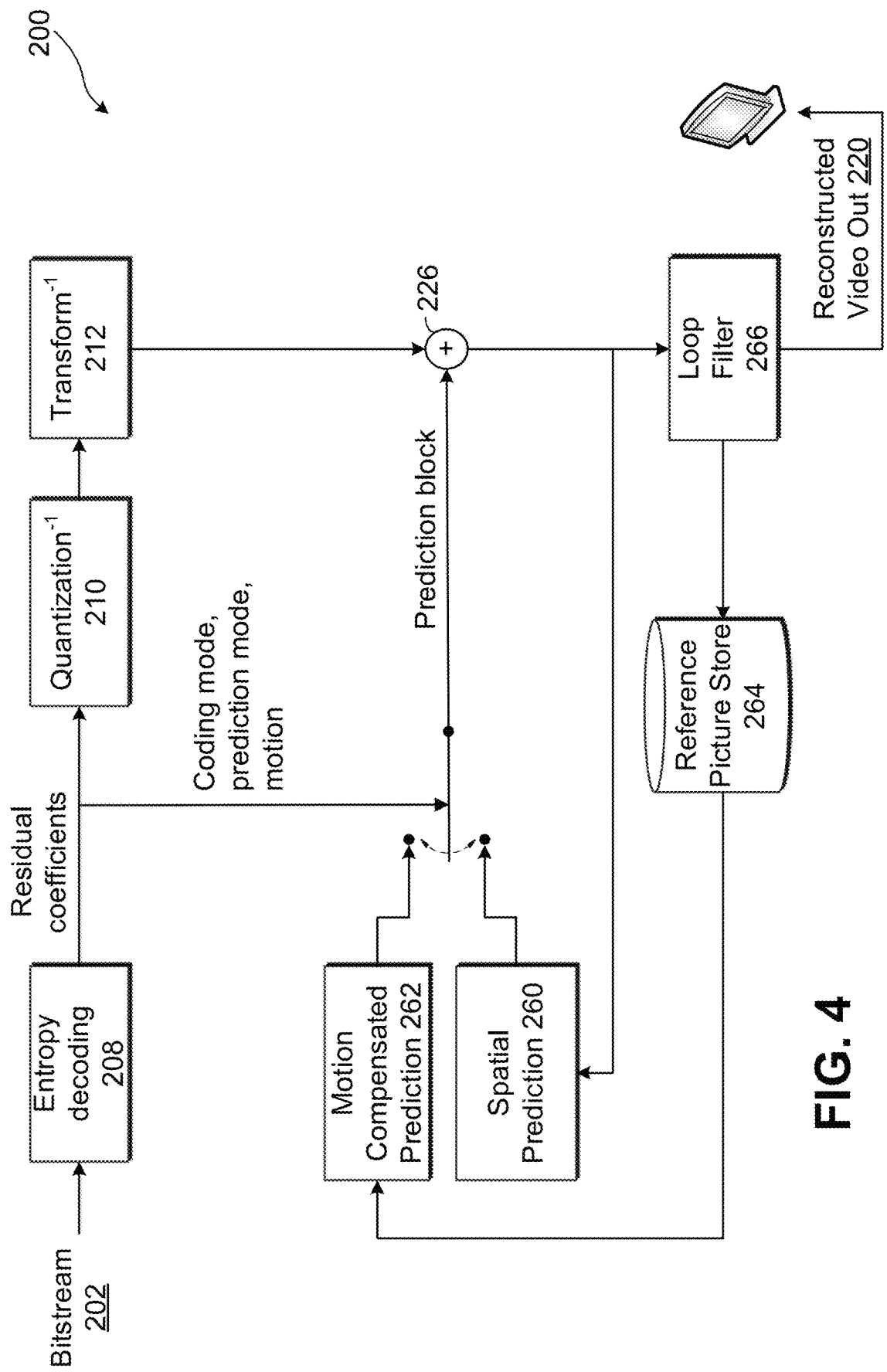
FIG. 4 is a functional block diagram of a block-based video decoder, such as a decoder used for VVC.

FIG. 4 is a functional block diagram of a block-based video decoder. The video bit-stream 202 is unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

As mentioned earlier, BMS-1.0 adheres to the same encoding/decoding workflow of the VTM-1.0 as shown in FIG. 2 and FIG. 4. However, several coding modules, especially the ones associated with temporal prediction, are further extended and enhanced. In the following, some inter tools that are included in BMS-1.0 or the previous JEM are briefly described.

Motion Vector Prediction.

Like HEVC, to reduce the overhead of signaling motion information, both VTM and BMS include two modes to code the motion information of each CU, namely merge mode and non-merge mode. In merge mode, the motion information of the current CU is directly derived from spatial and temporal neighboring blocks, and a competition-based scheme is applied to select the best neighboring block out of all the available candidates; correspondingly, only the index of the best candidate is sent for reconstructing the motion information of the CU at the decoder. If an inter-coded PU is coded in non-merge mode, the MV will be differentially coded using a MV predictor derived from an advanced motion vector prediction (AMVP) technique. Like the merge mode, AMVP derives the MV predictor from spatial and temporal neighboring candidates. Then, the difference between the MV predictor and the actual MV, and the index of the predictor are transmitted to the decoder.

Figure 5:
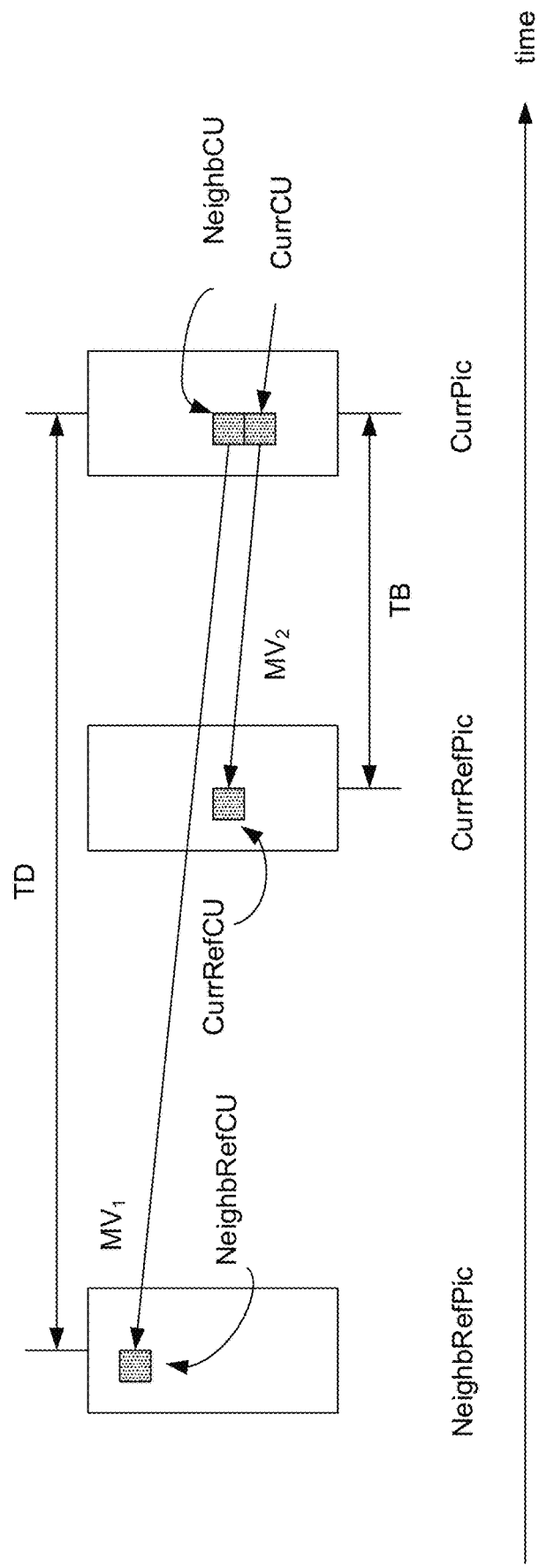
FIG. 5 illustrates an example of spatial motion vector prediction.

FIG. 5 shows an example for spatial MV prediction. In the current picture to be coded (CurrPic), the square CurrCU is the current CU, which has the best matching block CurrRefCU in the reference picture (CurrRefPic). CurrCU's MV, i.e., MV2, is to be predicted. The current CU's spatial neighborhood could be the upper, left, upper-left, bottom-left, upper-right neighboring CU of the current CU. In FIG. 5, the neighboring CU is shown as the upper neighbor, NeighbCU. NeighbCU's reference picture (NeighbRefPic) and MV (MV1) are both known, because NeighbCU has been coded before CurrCU.

Figure 6:
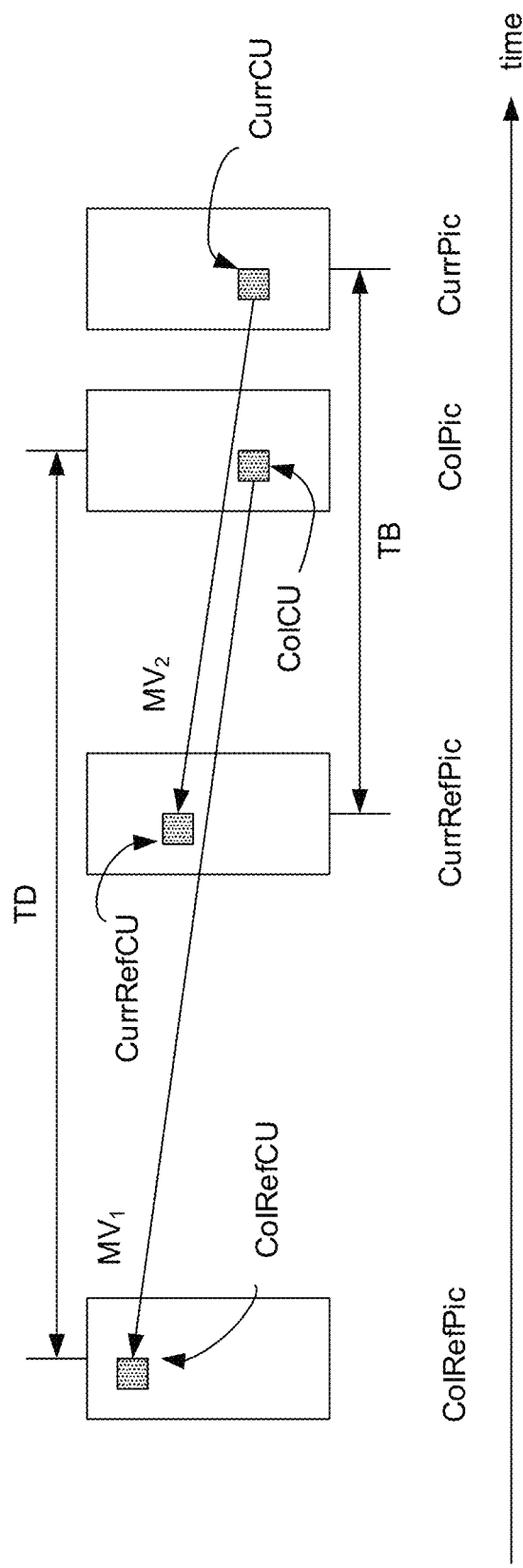
FIG. 6 illustrates an example of temporal motion vector prediction (TMVP).

FIG. 6 shows an example for temporal MV prediction (TMVP). There are four pictures (ColRefPic, CurrRefPic, ColPic, CurrPic) shown in FIG. 6. In the current picture to be coded (CurrPic), the square CurrCU is the current CU, which has the best matching block (CurrRefCU) in the reference picture (CurrRefPic). CurrCU's MV, i.e., MV2, is to be predicted. The current CU's temporal neighborhood is specified as the collocated CU (ColCU) in the neighboring picture (ColPic). ColCU's reference picture (ColRefPic) and MV (MV1) are both known, because ColPic has been coded before CurrPic.

For spatial and temporal motion vector prediction, given limited time and space, the MVs between different blocks are treated as translational with uniform velocity. In the examples of FIGS. 5 and 6, the temporal distance between the CurrPic and CurrRefPic is TB, and the temporal distance between CurrPic and NeighbRefPic in FIG. 5, or between ColPic and ColRefPic in FIG. 6, is TD. The scaled MV predictor may be calculated as $$MV'_2 = MV_1 \cdot \frac{TB}{TD} \quad (1)$$

Figure 7:
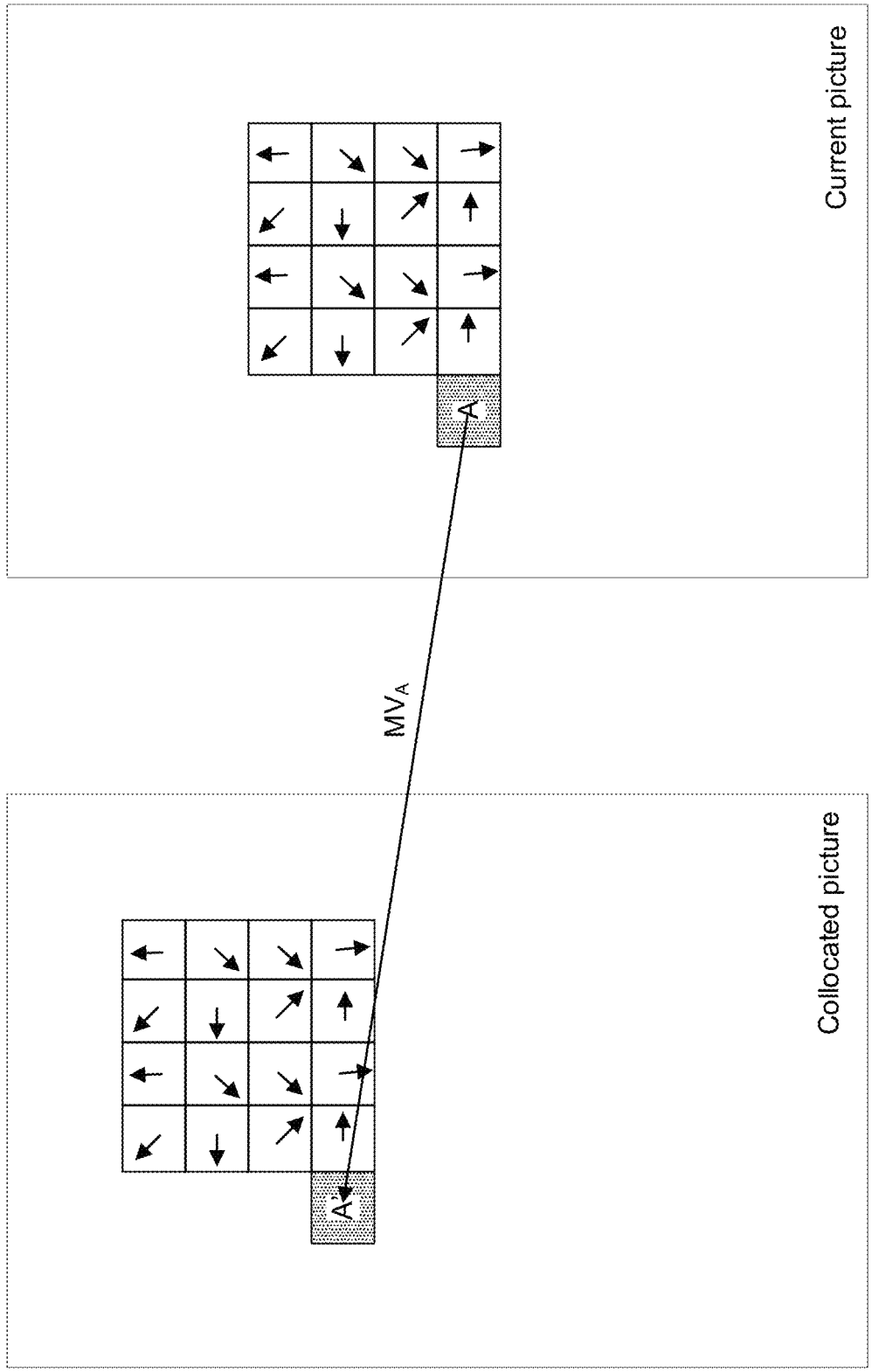
FIG. 7 illustrates an example of advanced temporal motion vector prediction (ATMVP).

In VTM-1.0, each merge block has at most one set of motion parameters (one motion vector and one reference picture index) for each prediction direction L0 and L1. In contrast, an additional merge candidate based on advanced temporal motion vector prediction (ATMVP) is included in BMS-1.0 to enable the derivation of motion information at the sub-block level. Using such a mode, the temporal motion vector prediction is improved by allowing a CU to derive multiple MVs for the sub-blocks in the CU. In general, the ATMVP derives the motion information of the current CU in two steps, as shown in FIG. 7. The first step is to identify the corresponding block of the current block (which is referred to as the collocated block) in a temporal reference picture. The selected temporal reference picture is called the collocated picture. The second step is to split the current block into sub-blocks and derive the motion information of each sub-block from the corresponding small block in the collocated picture.

In the first step, the collocated block and the collocated picture are identified by the motion information of the spatial neighboring blocks of the current block. In the current design, the first available candidate in the merge candidate list is considered. FIG. 7 illustrates this process. Specifically, in the example of FIG. 7, block A is identified as the first available merge candidate of the current block based on the scanning order of the merge candidate list. Then, the corresponding motion vector of block A (MVA) as well as its reference index are used to identify the collocated picture and the collocated block. The location of the collocated block in the collocated picture is determined by adding the motion vector of block A (MVA) to the coordinate of the current block.

In the second step, for each sub-block in the current block, the motion information of its corresponding small block (as indicated by the small arrows in FIG. 7) in the collocated block is used to derive the motion information of the sub-block. Specifically, after the motion information of each small block in the collocated block is identified, it is converted to the motion vector and reference index of the corresponding sub-block in the current block in the same way as the TMVP.

Decoder-Side Motion Vector Refinement (DMVR).

For the merge mode in VTM, when the selected merge candidate is bi-predicted, the prediction signal of the current CU is formed by averaging the two prediction blocks using the two MVs associated with the reference lists L0 and L1 of the candidate. However, the motion information of the merge candidate (which is derived from either spatial or temporal neighbors of the current CU) may not be accurate enough to represent the true motion of the current CU and therefore may compromise the inter prediction efficiency. To further improve the coding performance of merge mode, a decoder-side motion vector refinement (DMVR) method is applied in BMS-1.0 to refine the MVs of the merge mode. Specifically, when the selected merge candidate is bi-predicted, a bi-prediction template is firstly generated as the average of two prediction signals based on the MVs from the reference list L0 and L1, respectively. Then, block-matching based motion refinement is performed locally around the initial MVs using the bi-prediction template as the target, as explained below.

Figure 8A:
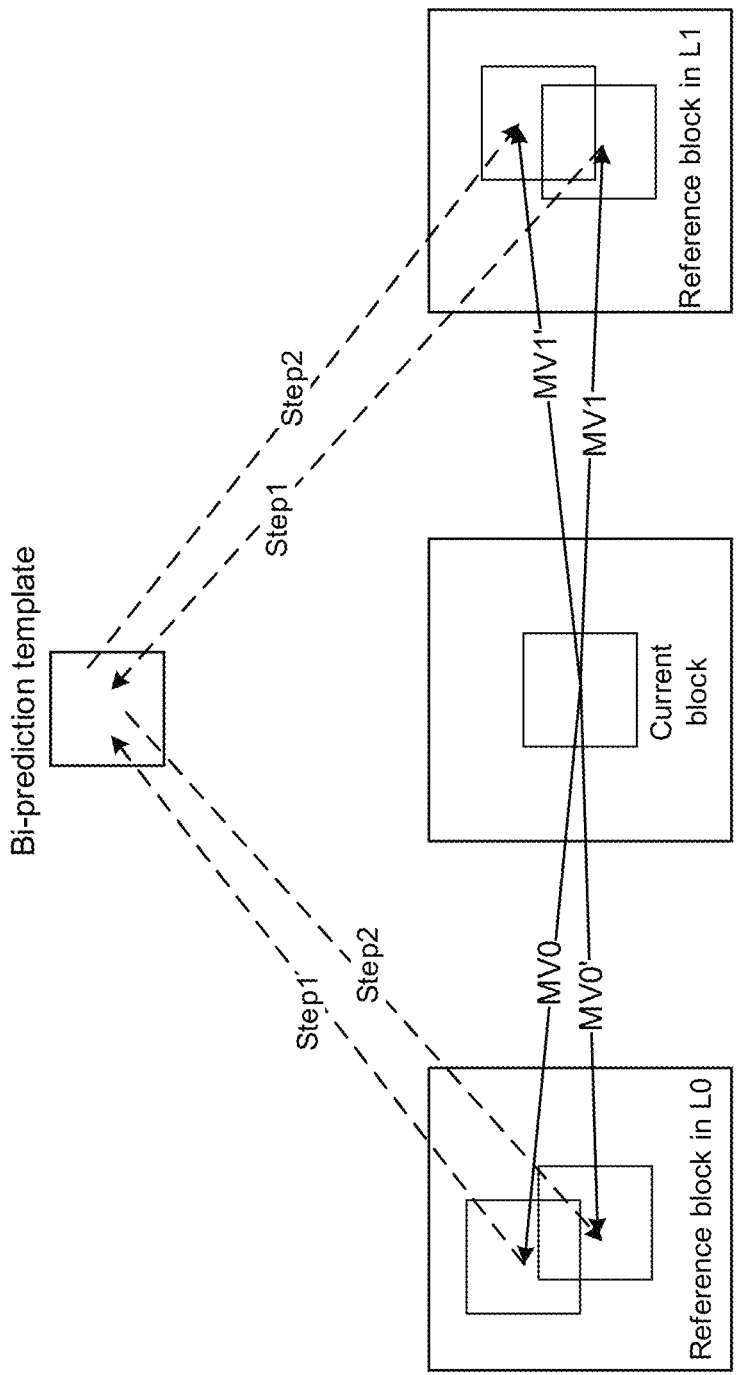
FIGS. 8A-8B illustrate an example of decoder-side motion vector refinement (DMVR).
Figure 8B:
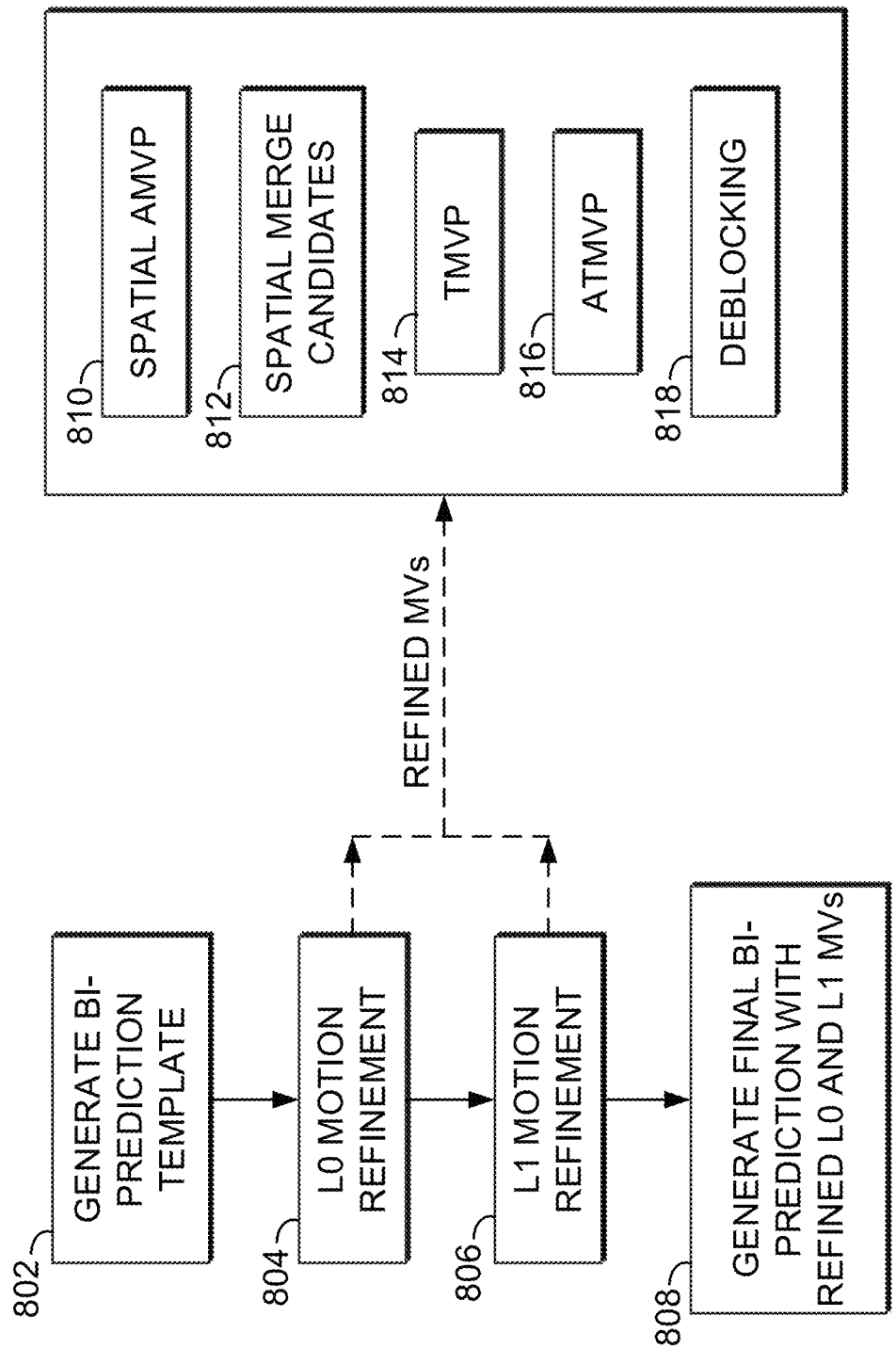

FIG. 8A illustrates a motion refinement process that is applied in DMVR. In general, DMVR refines the MVs of a merge candidate by the following two steps. As shown in FIG. 8A, in the first step, the bi-prediction template is generated by averaging the two prediction blocks using the initial MVs in L0 and L1 (i.e., $MV_0$ and $MV_1$) of the merge candidate. Then, for each reference list (i.e., L0 or L1), a block-matching based motion search is performed in the local region around the initial MVs. For each MV, i.e., $MV_0$ or $MV_1$ of the corresponding reference list around the initial MV in that list, the cost values (e.g., sum of absolute difference (SAD)) between the bi-prediction template and the corresponding prediction blocks using that motion vector are measured. For each of two prediction directions, the MV that minimizes the template cost in that prediction direction is considered as the final MV in the reference list of the merge candidate. In the current BMS-1.0, for each prediction direction, eight neighboring MVs surrounding the initial MV (with one integer sample offset) are considered during the motion refinement process. At the end, the two refined MVs ($MV_0'$ and $MV_1'$ as shown in FIG. 8A) are used to generate the final bi-prediction signal of the current CU. Additionally, in conventional DMVR, to further improve the coding efficiency, the refined MVs of a DMVR block are used to predict the motion information of its spatial and temporal neighboring blocks (e.g., based on spatial AMVP, spatial merge candidates, TMVP and ATMVP) and to calculate the boundary strength value of the deblocking filter that is applied to the current CU. FIG. 8B is a flow chart of an example of a DMVR process, where "spatial AMVP" and "spatial merge candidates" refer to the spatial MV prediction processes for the spatial neighboring CUs that are in the current picture and are coded after the current CU per the coding order of CUs; "TMVP" and "ATMVP" refer to the temporal MV prediction processes for the future CUs in the following pictures (the pictures that are coded after the current picture based on the picture coding order); and "deblocking" refers to the deblocking filtering processes of both the current block and its spatial neighboring blocks.

In the method illustrated in FIG. 8B, a bi-prediction template is generated at 802. At 804, motion refinement is performed for the L0 motion vector, and at 806, motion refinement is performed for the L1 motion vector. At 808, the final bi-prediction is generated using the refined L0 and L1 motion vectors. In the method of FIG. 8B, the refined motion vectors are used to predict the motion of subsequently-coded blocks. For example, the refined motion vectors are used for spatial AMVP (810), TMVP (814), and ATMVP (816). The refined motion vectors are also used as spatial merge candidates (812) and to calculate the boundary strength value of the deblocking filter that is applied to the current CU (818).

Bi-Directional Optical Flow.

Bi-prediction in VTM/BMS-1.0 is a combination of two temporal prediction blocks obtained from the reference pictures that are already reconstructed using averaging. However, due to the limitation of the block-based motion compensation, there may be remaining small motion that can be observed between the two prediction blocks, thus reducing the efficiency of motion-compensated prediction. To address this issue, bi-directional optical flow (BIO) was used in JEM to compensate such motion for every sample inside a block. Specifically, BIO is a sample-wise motion refinement that is performed on top of the block-based motion-compensated predictions when bi-prediction is used. The derivation of the refined motion vector for each sample in one block is based on the classical optical flow model. Let $I^{(k)}(x, y)$ be the sample value at the coordinate $(x, y)$ of the prediction block derived from the reference picture list k (k=0, 1), and $\partial I^{(k)}(x, y)/\partial x$ and $\partial I^{(k)}(x, y)/\partial y$ are the horizontal and vertical gradients of the sample. The modified bi-prediction signal by BIO is obtained as:

$$pred'(x, y) = \frac{1}{2} \cdot \begin{bmatrix} I^{(0)}(x, y) + I^{(1)}(x, y) + \\ \frac{v_x}{2}\left(\tau_1 \frac{\partial I^{(1)}(x, y)}{\partial x} - \tau_0 \frac{\partial I^{(0)}(x, y)}{\partial x}\right) + \\ \frac{v_y}{2}\left(\tau_1 \frac{\partial I^{(1)}(x, y)}{\partial y} - \tau_0 \frac{\partial I^{(0)}(x, y)}{\partial y}\right) \end{bmatrix} \quad (2)$$

where $\tau_0$ and $\tau_1$ are the temporal distances of the reference pictures Ref0 and Ref1 associated with $I^{(0)}$ and $I^{(1)}$ to the current picture. Further, the motion refinement $(v_x, v_y)$ at the sample location $(x, y)$ is calculated by minimizing the difference $\Delta$ between the values of the samples after motion refinement compensation, as shown as $$\Delta(x, y) = I^{(0)}(x, y) - I^{(1)}(x, y) + \quad (3)$$
$$v_x\left(\tau_1 \frac{\partial I^{(1)}(x, y)}{\partial x} + \tau_0 \frac{\partial I^{(0)}(x, y)}{\partial x}\right) + v_y\left(\tau_1 \frac{\partial I^{(1)}(x, y)}{\partial y} + \tau_0 \frac{\partial I^{(0)}(x, y)}{\partial y}\right)$$

Additionally, to provide for the regularity of the derived motion refinement, it is assumed that the motion refinement is consistent within a local surrounding area centered at $(x, y)$; therefore, the values of $(v_x, v_y)$ are derived by minimizing an optical flow error metric $\Delta$ inside the 5×5 window $\Omega$ around the current sample at $(x, y)$ as $$(v_x^*, v_y^*) = \underset{(v_x, v_y)}{\operatorname{argmin}} \sum_{(i,j) \in \Omega} \Delta^2(i, j) \quad (4)$$

It should be mentioned that, different from DMVR, the motion refinement $(v_x, v_y)$ derived by BIO is only applied to enhance the bi-prediction signal but not to modify the motion information of the current CU. In other words, the MVs that are used to predict the MVs of the spatial and temporal neighboring blocks and to decide the deblocking boundary strength of the current CU are still the original MVs (i.e., the MVs that are used to generate the block-based motion compensation signals $I^{(0)}(x, y)$ and $I^{(1)}(x, y)$) of the CU before BIO is applied).

DMVR Coding Latency.

Like HEVC and its predecessors, VTM-1.0 employs motion compensated prediction (MCP) to efficiently reduce the temporal redundancy between pictures, thus achieving high inter coding efficiency. Because the MVs that are used to generate the predication signal of one CU are either signaled in the bitstream or inherited from its spatial/temporal neighbors, there is no dependency between the MCPs of spatial neighboring CUs. As a result, the MCP processes of all the inter blocks in the same picture/slice are independent from each other. Thus, for VTM-1.0 and for HEVC, the decoding processes of multiple inter blocks can be done in parallel, e.g., they can be assigned to different threads to exploit the parallelism.

As described above, the DMVR tool is applied in BMS-1.0. To avoid introducing extra signaling overhead, the motion refinements are derived using the two prediction signals associated with the original L0 and L1 MVs of a CU. Thus, when the motion information of a CU is predicted from one of its spatial neighbors (e.g., by AMVP and merge mode) that is coded by the DMVR, its decoding process waits until the MVs of the neighboring block are fully reconstructed by the DMVR. This could significantly complicate the pipeline design, especially at the decoder side, therefore leading to significant complexity increase for the hardware implementation.

Figure 9:
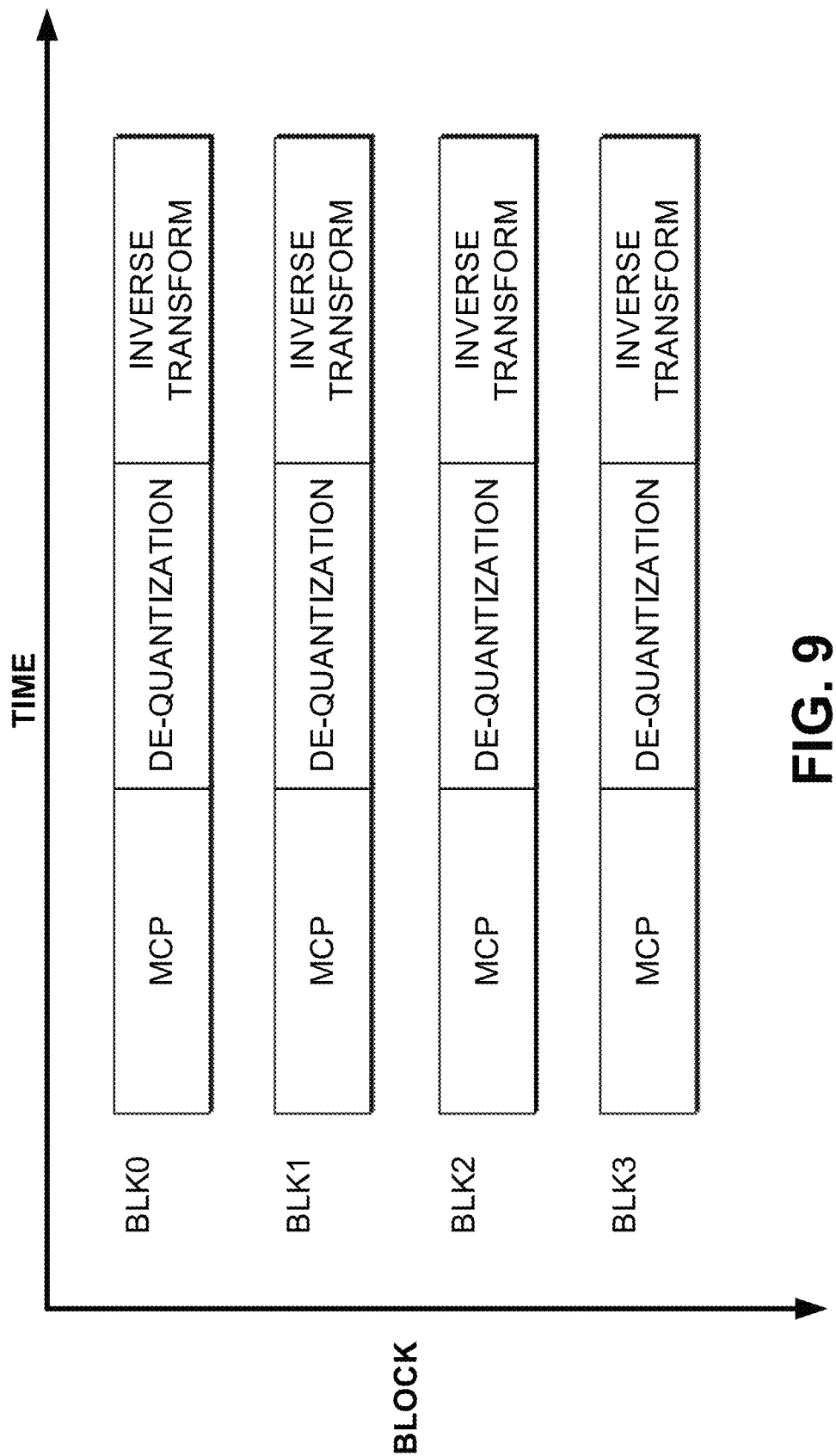
FIG. 9 illustrates parallel decoding for VTM-1.0.
Figure 10:
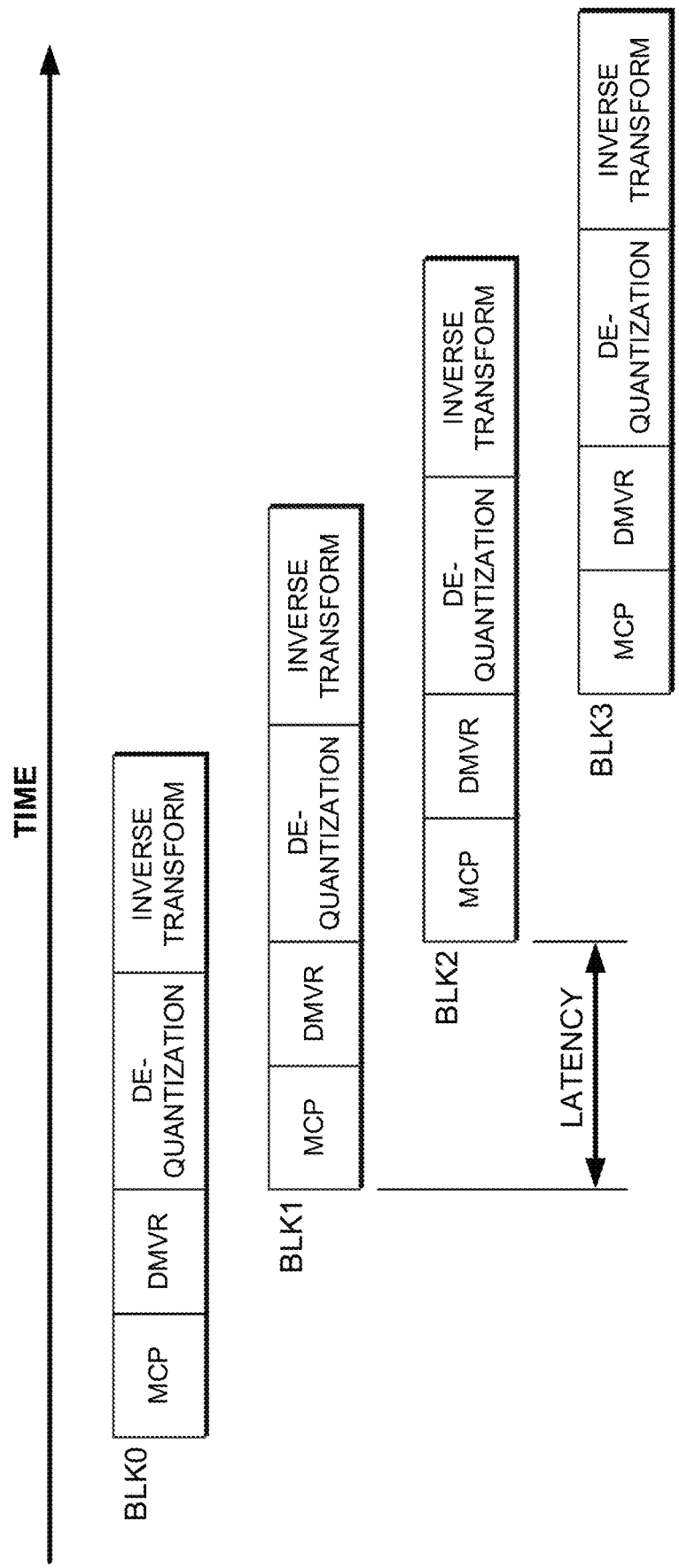
FIG. 10 illustrates the decoding latency caused by the DMVR.

To illustrate the coding latency caused by DMVR, FIG. 9 and FIG. 10 show examples to compare the decoding process of VTM-1.0 and BMS-1.0. To facilitate the explanation, a case is described in which there are four CUs of equal block-size and all four CUs are coded by the DMVR, each being decoded by a separate decoding thread; the decoding complexity of each individual decoding module (e.g., the MCP, the DMVR, the dequantization and the inverse transform) is assumed to be the same for four CUs. As shown in FIG. 9, because the four CUs can be decoded in parallel, the total decoding time of VTM-1.0 is equal to the decoding time of one CU, i.e., $T_{MCP}+T_{de-quant}+T_{inv-trans}$. Due to the dependency introduced by the DMVR, for the decoding process of BMS-1.0 (as shown in FIG. 10), the decoding of each individual coding block cannot be invoked until the DMVR of its spatial neighboring blocks are fully finished. Thus, the total decoding time of the four CUs for BMS-1.0 is equal to $T_{total}=4*(T_{MCP}+T_{DMVR})+T_{de-quant}+T_{inv-trans}$. As can be seen, the usage of the prediction samples to refine the motion information by the DMVR introduces dependency among neighboring inter blocks, therefore significantly increasing the latency for both encoding and decoding processes.

Overview of Latency Reduction Methods.

Methods are proposed in the present disclosure to remove or reduce the encoding/decoding latency of the DMVR while preserving its main coding performance. Specifically, various embodiments of the disclosure include one or more of the following aspects.

Unlike in the current DMVR method in BMS-1.0 where the refined DMVR motion of one block are always used to predict the motion of its spatial/temporal neighboring blocks and derive the deblocking filter strength, it is proposed in some embodiments to completely or partially use the non-refined MVs of a DMVR block (the MVs that are used to generate the original bi-prediction signal) for the MV prediction and deblocking processes. Given that the original MVs can be obtained directly from parsing and motion vector reconstruction (motion vector predictor plus parsed motion vector difference) without the DMVR, there is no dependency between neighboring blocks, and the decoding processes of multiple inter CUs can be done in parallel.

Since the non-refined MVs may be less accurate than the refined MVs, this may result in some coding performance degradation. To reduce such loss, it is proposed in some embodiments to divide a picture/slice into multiple regions. Moreover, additional constraints are proposed in some embodiments such that the decoding of multiple CUs inside the same region or multiple CUs from different regions can be performed independently.

In some embodiments, motion derivation methods based on optical flow are proposed to replace the block-matching based motion search for calculating the motion refinements of each DMVR CU. Compared to the block-matching based method which performs motion search in a small local window, some embodiments directly calculate motion refinements based on the spatial and temporal sample derivatives. This may not only reduce the computational complexity but may also increase the motion refinement precision, because the value of the derived refined motion is not limited to the search window.

Use of Non-Refined Motion Vectors for DMVR Latency Reduction.

As pointed out above, using the refined MVs of one DMVR block as the MV predictors of its neighboring blocks is unfriendly to parallel encoding/decoding for real codec design, because the encoding/decoding of the neighboring blocks is not performed until the refined MVs of the current block is fully reconstructed though DMVR. Based on such analysis, methods are proposed in this section to remove the coding latency caused by DMVR. In some embodiments, the core design of DMVR (e.g., block-matching based motion refinement) remains the same as the existing design. However, the MVs of DMVR blocks that are used to perform MV predictions (e.g., AMVP, merge, TMVP and ATMVP) and deblocking are modified such that the dependency between neighboring blocks caused by the DMVR may be removed.

Use of Non-Refined Motion Vectors for Spatial and Temporal Motion Prediction.

Figure 11:
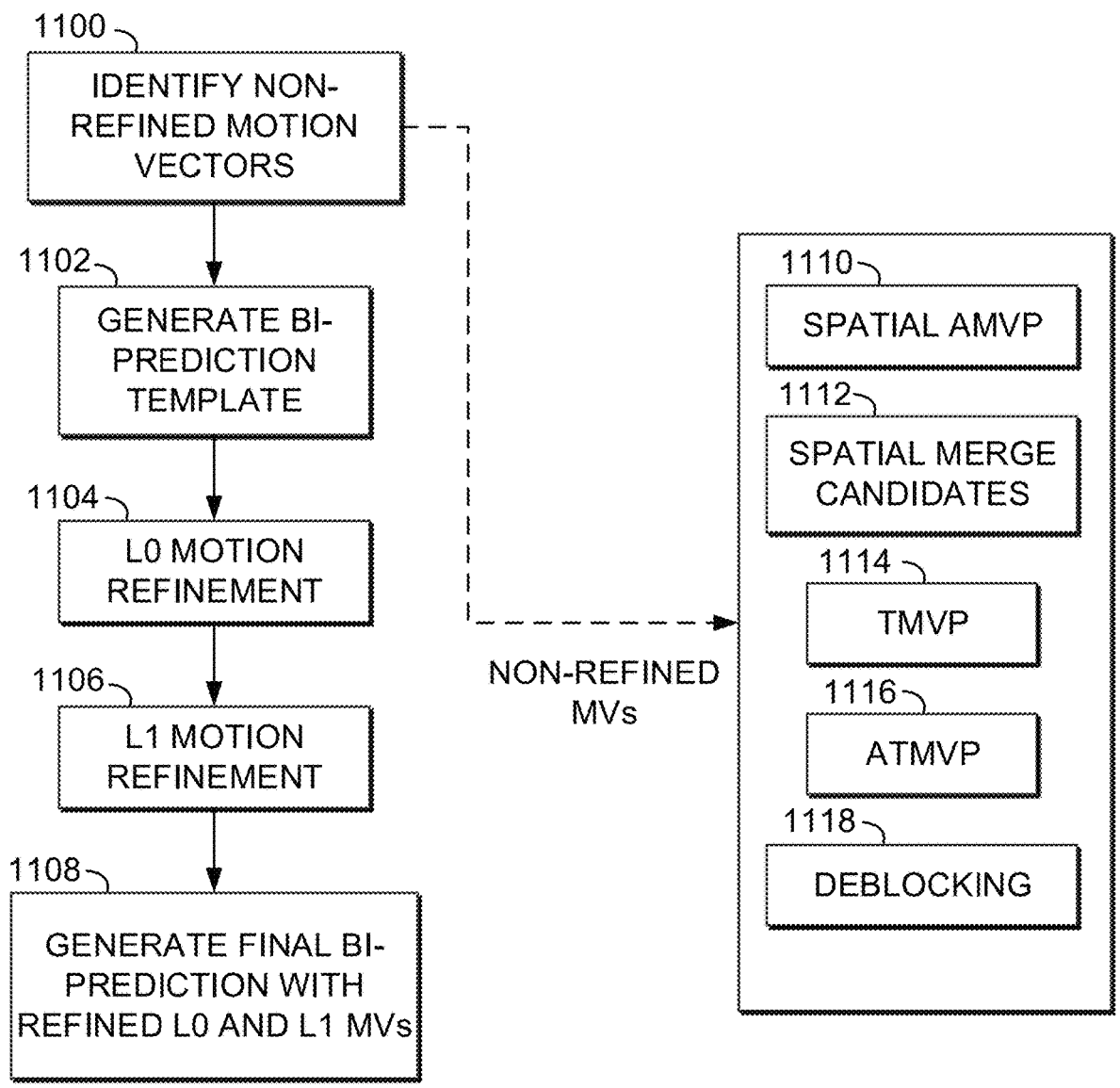
FIG. 11 illustrates an embodiment in which the refined MVs from DMVR are only used to generate the bi-prediction signal.

In some embodiments, instead of using the refined motion, it is proposed to always perform MV predictions and deblocking using the non-refined motion of DMVR blocks. FIG. 11 illustrates a modified DMVR process after such a method is applied. As shown in FIG. 11, instead of using the refined MVs, the non-refined MVs (the original MVs before the DMVR) are used to derive the MV predictors and determine the boundary strength of the deblocking filter. The refined MVs are only used to generate the final bi-prediction signal of the block. Because the dependency between the refined MVs of the current block and the decoding of its neighboring blocks does not exist, such embodiments may be used to remove the encoding/decoding latency of the DMVR.

Use of Non-Refined Motion Vectors for Spatial Motion Prediction.

In the example of FIG. 11, the non-refined MVs of a DMVR block are used to derive the temporal motion predictors for the collocated blocks in future pictures through TMVP and ATMVP and to calculate the boundary strength for the deblocking filter between the current block and its spatial neighbors. Because the non-refined MVs may be less accurate than the refined MVs, this could lead to some coding performance losses. On the other hand, temporal motion prediction (TMVP and ATMVP) predicts the MVs in the current picture using the MVs of previously decoded pictures (specifically the collocated picture). Therefore, before performing the temporal motion prediction for the current picture, the refined MVs of the DMVR CUs in the collocated picture are already reconstructed. A similar situation is also applicable to the deblocking filter process: because the deblocking filter is applied to reconstructed samples, it can only be invoked after the samples of the current block are fully reconstructed though MC (including the DMVR), dequantization and inverse transform. Therefore, before the deblocking is applied to a DMVR block, the refined MVs are already available.

In the method illustrated in FIG. 11, non-refined motion vectors for a first block are identified at 1100. The non-refined motion vectors may have been signaled for the first block using any of a variety of available MV signaling techniques. The non-refined motion vectors are used at 1102 to generate a bi-prediction template. At 1104, motion refinement is performed for the L0 motion vector, and at 1106, motion refinement is performed for the L1 motion vector. At 1108, the final bi-prediction of the first block is generated using the refined L0 and L1 motion vectors. In the method of FIG. 11, the non-refined motion vectors are used to predict the motion of subsequently-coded blocks (e.g. a second block). For example, the non-refined motion vectors are used for spatial AMVP (1110), TMVP (1114), and ATMVP (1116). The non-refined motion vectors are also used as spatial merge candidates (1112) and to calculate the boundary strength value of the deblocking filter (1118).

Figure 12:
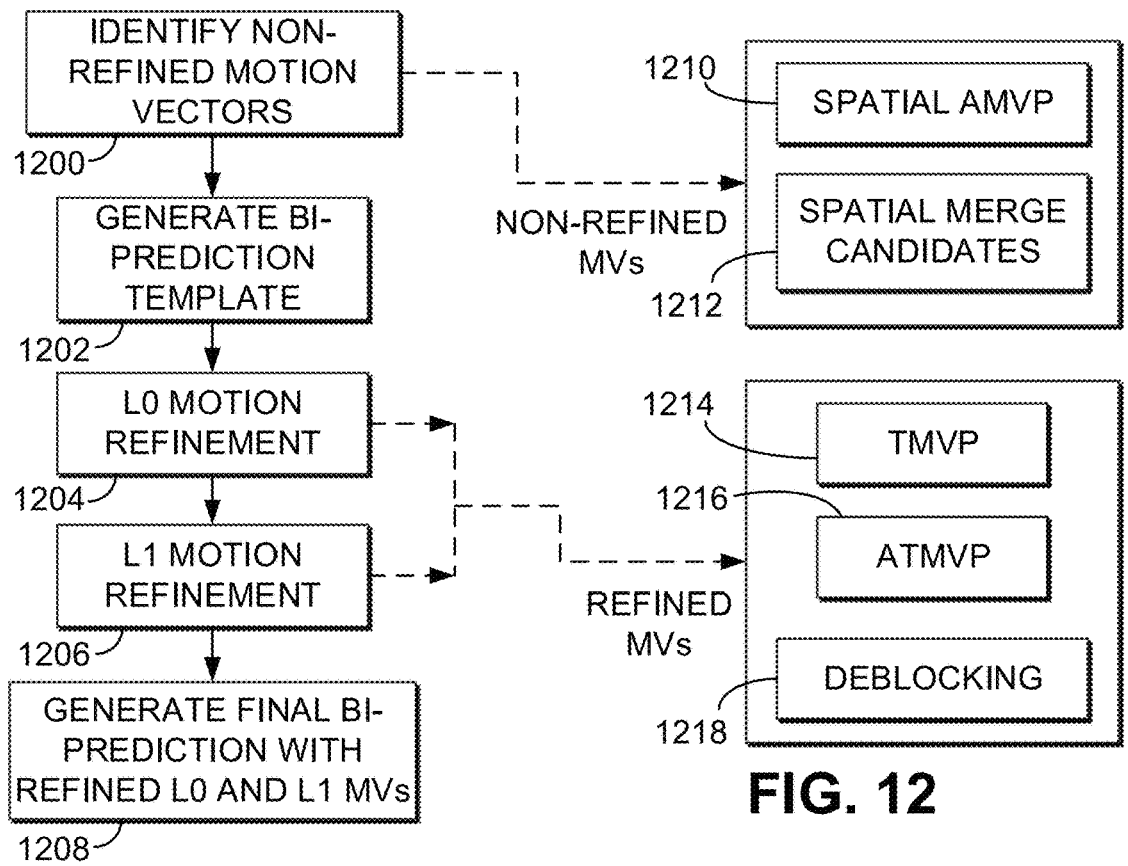
FIG. 12 illustrates an embodiment in which the refined MVs from DMVR are used for temporal motion prediction and deblocking and the non-refined MVs are used for spatial motion prediction.

In another embodiment, to address these issues and to achieve a better coding performance, it is proposed to use different MVs of a DMVR block (the non-refined MVs and the refined MVs) for the spatial motion prediction, the temporal motion prediction and the deblocking filter. Specifically, in this embodiment, the non-refined MVs are only used to derive the MV predictors for the spatial motion prediction (e.g., the spatial AMVP and spatial merge candidates), while the refined MVs are used to not only derive the final prediction of the block but also generate the MV predictors for temporal motion prediction (TMVP and ATMVP) and calculate the boundary strength parameter of the deblocking filter. FIG. 12 illustrates a DMVR process according to this second embodiment.

In the method illustrated in FIG. 12, non-refined motion vectors for a first block are identified at 1200. The non-refined motion vectors may have been signaled for the first block using any of a variety of available MV signaling techniques. The non-refined motion vectors are used at 1202 to generate a bi-prediction template. At 1204, motion refinement is performed for the L0 motion vector, and at 1206, motion refinement is performed for the L1 motion vector. At 1208, the final bi-prediction of the first block is generated using the refined L0 and L1 motion vectors. In the method of FIG. 12, the non-refined motion vectors are used to predict the motion of subsequently-coded blocks (e.g. a second block) within the same picture as the first block. For example, the non-refined motion vectors are used for spatial AMVP (1110) and as spatial merge candidates (1212). The refined motion vectors are used to predict the motion of subsequently-coded blocks (e.g. a third block) in other pictures, for example using TMVP (1214) or ATMVP (1216). The refined motion vectors are also used to calculate the boundary strength value of the deblocking filter (1218). Use of Non-Refined Motion Vectors for Spatial Motion Prediction and Deblocking.

Figure 13:
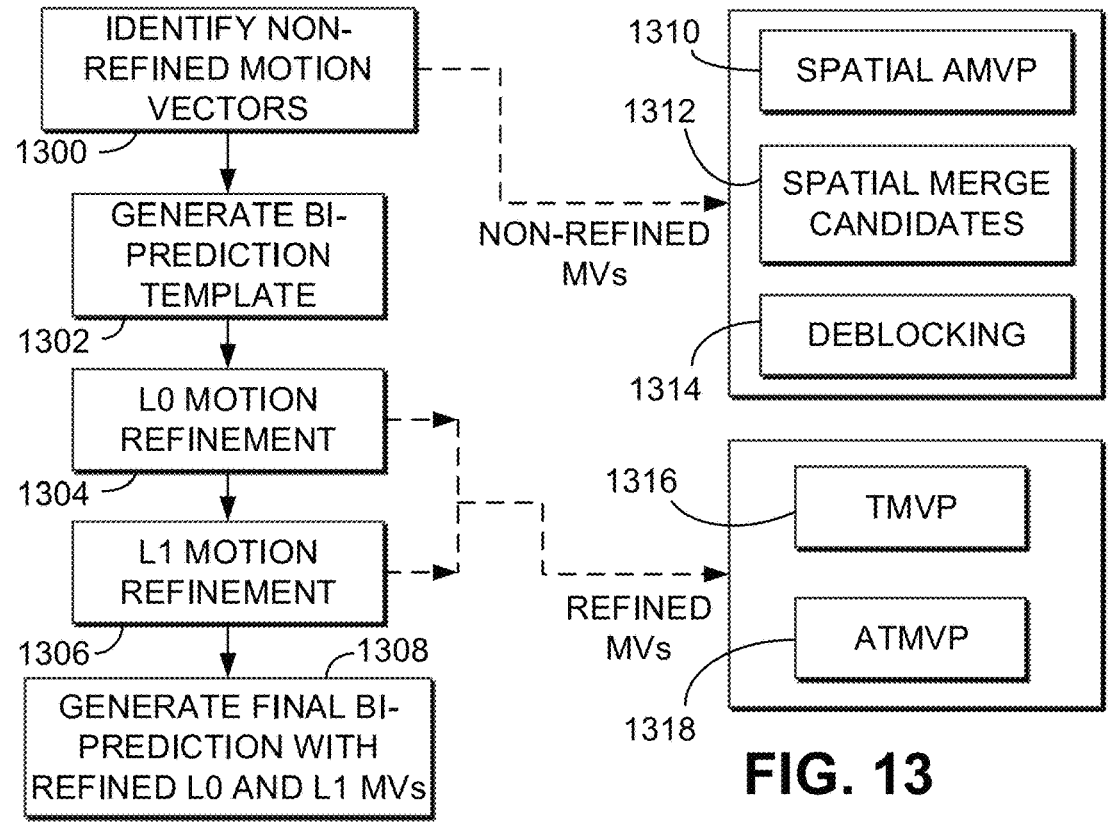
FIG. 13 illustrates an embodiment in which where the refined MVs from DMVR are used for temporal motion prediction and the non-refined MVs are used for spatial motion prediction and deblocking.

In the example of FIG. 12, different MVs of a DMVR block are used for the spatial motion prediction and the deblocking filter. On the other hand, unlike the MVs used for temporal motion prediction (which are stored in external memory), the MVs that are used for spatial motion prediction and deblocking are often stored using on-chip memories for practical codec design to increase the data accessing speed. Therefore, some implementations of the method of FIG. 12 call for two different on-chip memories to store both the non-refined and refined MVs for each DMVR block. This could double the line-buffer size that is used to cache the MVs, which may be undesirable for hardware implementations. To keep the total on-chip memory size of the MV storage the same as in VTM-1.0, it is proposed in a further embodiment to use the non-refined MVs of DMVR blocks for the deblocking process. FIG. 13 illustrates an example of a DMVR process according to this embodiment. Specifically, like the method in FIG. 12, the refined DMVR MVs are also used to generate the temporal motion predictors through TMVP and ATMVP in addition to the generation of the final bi-prediction signal. However, in the embodiment of FIG. 13, the non-refined MVs are used to not only derive the spatial motion predictors (spatial AMVP and spatial merge) but also to determine the boundary strength for the deblocking filter of the current block.

In the method illustrated in FIG. 13, non-refined motion vectors for a first block are identified at 1300. The non-refined motion vectors may have been signaled for the first block using any of a variety of available MV signaling techniques. The non-refined motion vectors are used at 1302 to generate a bi-prediction template. At 1304, motion refinement is performed for the L0 motion vector, and at 1306, motion refinement is performed for the L1 motion vector. At 1308, the final bi-prediction of the first block is generated using the refined L0 and L1 motion vectors. In the method of FIG. 13, the non-refined motion vectors are used to predict the motion of subsequently-coded blocks (e.g. a second block) within the same picture as the first block. For example, the non-refined motion vectors are used for spatial AMVP (1310) and as spatial merge candidates (1312). The non-refined motion vectors are also used to calculate the boundary strength value of the deblocking filter (1314). The refined motion vectors are used to predict the motion of subsequently-coded blocks (e.g. a third block) in other pictures, for example using TMVP (1316) or ATMVP (1318).

Figure 14:
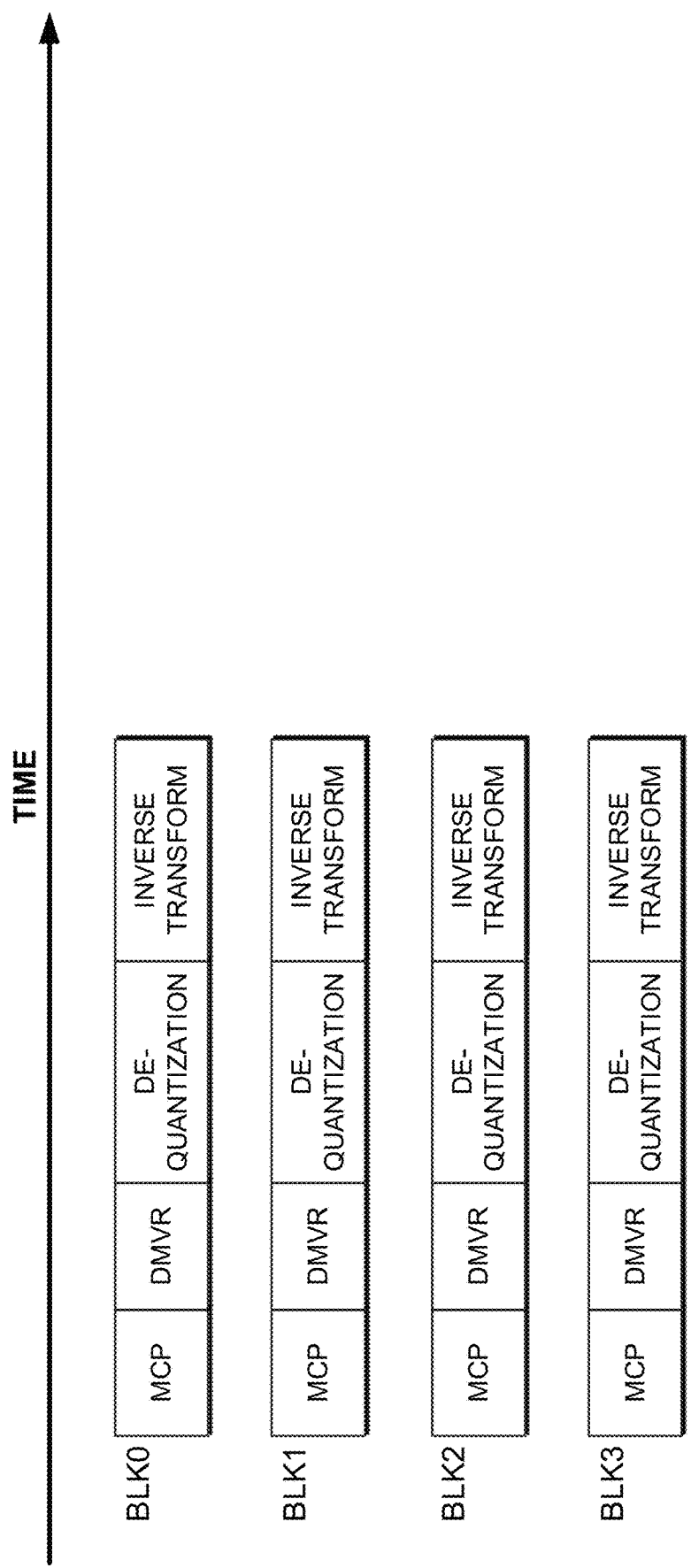
FIG. 14 illustrates parallel decoding after applying latency removal methods for DMVR according to some embodiments.

The embodiments of FIGS. 11-13 may reduce or remove the encoding/decoding latency caused by the DMVR, given that the dependency of the decoding of one block on the reconstruction of the refined MVs of its spatial neighboring DMVR blocks is not present in those embodiments. Based on the same example in FIG. 10, FIG. 14 illustrates an example of a parallel decoding process when one of the methods of FIGS. 11-13 is applied. As shown in FIG. 14, because the decoding of multiple DMVR blocks can be performed in parallel, there is no decoding latency between neighboring blocks. Correspondingly, the total decoding time may be equal to the decoding of one block, which may be represented as $T_{MCP}+T_{DMVR}+T_{de\text{-}quant}+T_{inv\text{-}trans}$.

Segment-Based Methods for DMVR Latency Reduction.

As pointed out above, one cause of encoding/decoding latency for DMVR is the dependency between the reconstruction of the refined MVs of a DMVR block and the decoding of its neighboring blocks, which is incurred by spatial motion prediction (e.g., spatial AMVP and spatial merge mode). Although methods such as those of FIGS. 11-13 can remove or reduce the coding latency of the DMVR, this reduced latency may comes at the expense of degraded coding efficiency due to the less accurate non-refined MVs being used for the spatial motion prediction. On the other hand, as shown in FIG. 10, the worst-case encoding/decoding latency introduced by the DMVR is directly related to the maximum number of consecutive blocks that are coded by the DMVR mode. To address these issues, in some embodiments, region-based methods are used to reduce the encoding/decoding latency while reducing the coding losses caused by using non-refined MVs for spatial motion prediction.

Specifically, in some embodiments, a picture is divided into a plurality of non-overlapped segments, and the non-refined MVs of each DMVR block in a segment are used as the predictors to predict the MVs of its neighboring blocks in the same segment. But, when a DMVR block is located on the right or bottom boundary of a segment, its non-refined MVs will not be used; instead, the refined MVs of the block are used as the predictor to predict the MVs of the blocks from the neighboring segment for better efficiency of spatial motion prediction.

Figure 15:
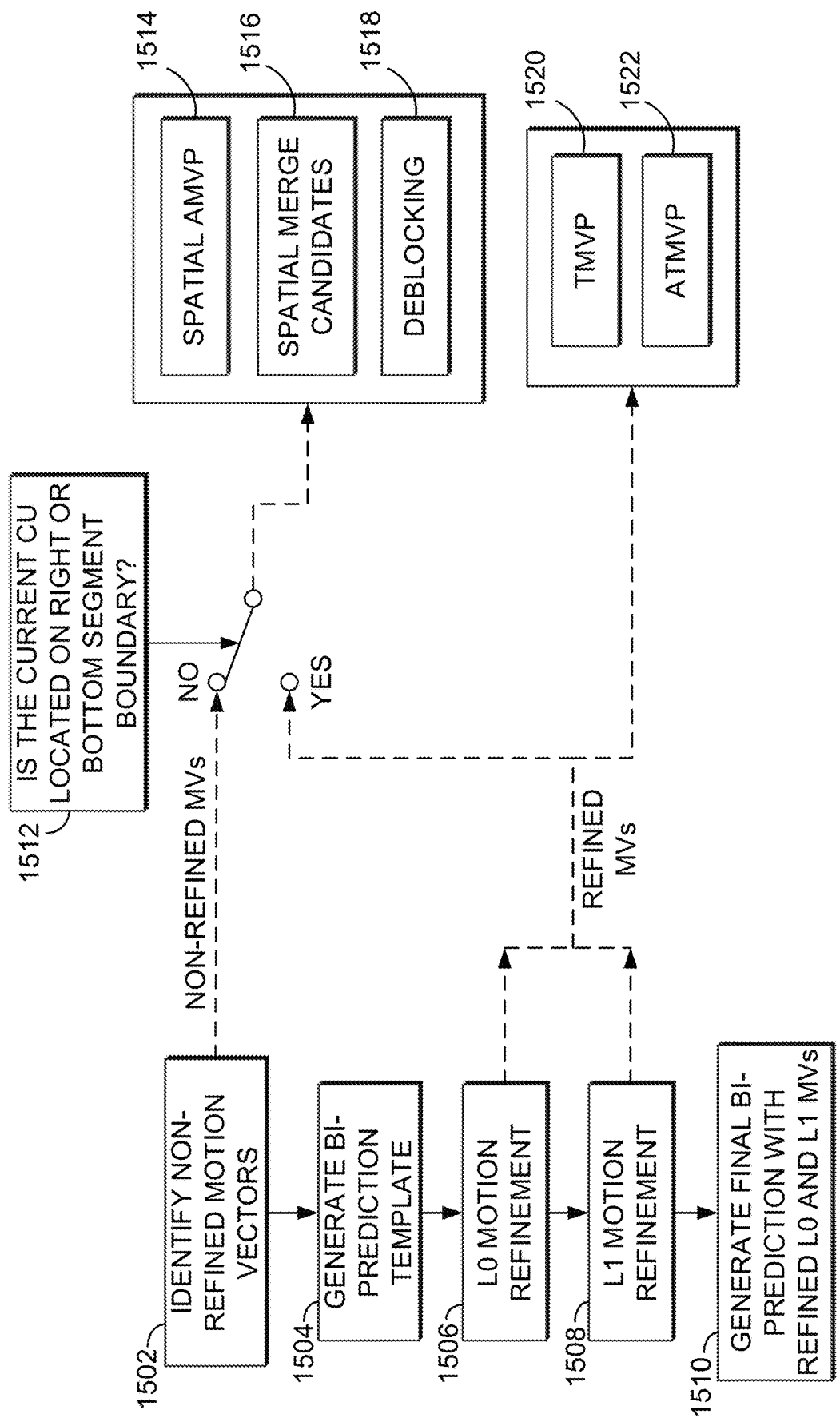
FIG. 15 illustrates an embodiment using non-refined MVs for DMVR blocks inside a picture segment for the spatial motion prediction and deblocking.
Figure 16:
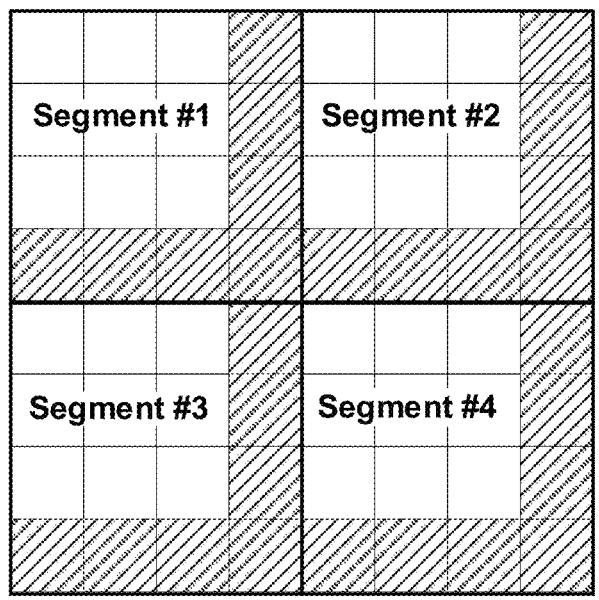
FIG. 16 illustrates an embodiment in which the current picture is divided into multiple segments and coding latency is reduced for the blocks inside each segment.

FIG. 15 illustrates an example of a DMVR process according to one embodiment, and FIG. 16 illustrates an example in which the blank blocks represent the DMVR blocks that use the non-refined MVs for spatial motion prediction, spatial merge, and deblocking, and the patterned blocks represent the DMVR blocks that use the refined MVs for spatial motion prediction, spatial merge, and deblocking. In the example of FIG. 16, the encoding/decoding of different inter blocks inside the same segment can be performed independently from each other, while the decoding of the blocks from different segments are still dependent. For example, because the blocks on the left boundaries of segment #2 may use the refined MVs of the neighboring DMVR blocks in segment #1 as spatial MV predictors, their decoding processes cannot be started until the DMVR of those neighboring blocks in segment #1 are fully done. Additionally, as shown in FIG. 15, similar to the method in FIG. 13, the same MVs of one DMVR block are used for the spatial motion predictions and the deblocking filter to avoid increasing the on-chip memory for storing MVs. In another embodiment, it is proposed to always use refined MVs for the deblocking process.

In the method illustrated in FIG. 15, non-refined motion vectors for a first block are identified at 1502. The non-refined motion vectors may have been signaled for the first block using any of a variety of available MV signaling techniques. The non-refined motion vectors are used at 1504 to generate a bi-prediction template. At 1506, motion refinement is performed for the L0 motion vector, and at 1508, motion refinement is performed for the L1 motion vector. At 1510, the final bi-prediction of the first block is generated using the refined L0 and L1 motion vectors.

At 1512, a determination is made of whether the first block is located on a right or bottom segment boundary. If the first block is not located on a right or bottom segment boundary, then the non-refined motion vectors are used to predict the motion of subsequently-coded blocks (e.g. a second block) within the same picture as the first block. For example, the non-refined motion vectors are used for spatial AMVP (1514) and as spatial merge candidates (1516). The non-refined motion vectors are also used to calculate the boundary strength value of the deblocking filter (1518). On the other hand, if the first block is located on a right or bottom segment boundary, then the refined motion vectors are used to predict the motion of subsequently-coded blocks (e.g. a second block) within the same picture as the first block (e.g. with AMVP 1514 and spatial merge candidates 1516), and the refined motion vectors are also used to calculate the boundary strength value of the deblocking filter (1518). Regardless of the outcome of the determination at 1512, the refined motion vectors are used to predict the motion of subsequently-coded blocks (e.g. a third block) in other pictures, for example using TMVP (1520) or ATMVP (1522).

In the embodiment of FIG. 16, the refined MVs are only enabled for spatial motion prediction of the blocks lying on the left/top boundaries of the segments inside one picture. However, depending on the segment size, the overall percentage of the blocks where the refined MVs can be applied for spatial motion prediction may be relatively small. The result may still be a non-negligible performance drop for the spatial motion prediction. To further improve the performance, it is proposed in some embodiments to allow the refined MVs of the DMVR blocks inside one segment to predict the MVs of the neighboring blocks inside the same segment. As a result, however, the decoding of multiple blocks inside one segment cannot be done in parallel. To improve the encoding/decoding parallelism, in this method, it is also proposed to prohibit the current block from using the MVs (either non-refined MV or refined MV) of a neighboring block that is from another segment as the predictors for the spatial motion predictions (e.g., spatial AMVP and spatial merge). Specifically, by such method, if a neighboring block is from a different segment to the current block, it will be treated as unavailable for spatial motion vector prediction.

Figure 17:
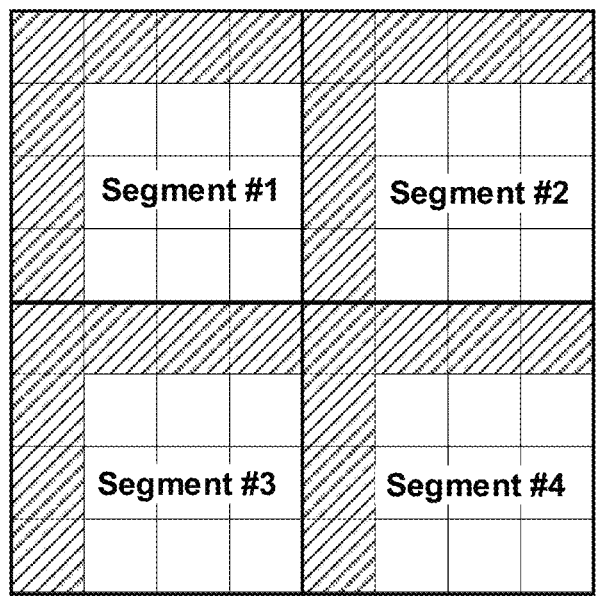
FIG. 17 illustrates an embodiment in which the current picture is divided into multiple segments and the coding latency is reduced for blocks from different segments.

One such embodiment is illustrated in FIG. 17. In FIG. 17, the blank blocks represent the CUS that are allowed to use the neighboring MVs (the neighboring MV could be refined MVs if the neighboring block is one DMVR block or non-refined MV if otherwise) for spatial motion predictions; the patterned blocks represent the CUs that are prevented from using the MVs of its neighboring blocks from a different segment for spatial motion prediction An embodiment according to FIG. 17 allows parallelized decoding of inter blocks across segments, but not within one segment.

In general, DMVR is only enabled for the bi-directional predicted CUs which have both the forward and backward prediction signals. Specifically, DMVR calls for use of two reference pictures: one with smaller picture order count (POC) and the other with larger POC than the POC of the current picture. In contrast, low-delay (LD) pictures are predicted from reference pictures that both precede the current picture in display order, with the POCs of all the reference pictures in L0 and L1 being smaller than the POC of the current picture. Therefore, the DMVR cannot be applied to LD pictures, and the coding latency caused by the DMVR does not exist in LD pictures. Based on such analysis, in some embodiments, when the DMVR is applied, it is proposed to only apply the above DMVR parallelism constraint (disabling the spatial motion predictions across segment boundaries) for non-LD pictures. For LD pictures, the constraint is not applied, and it is still permitted to predict the MVs of a current block based on the MVs of its spatial neighbors from another segment. In a further embodiment, the encoder/decoder determines whether the constraint is applied or not based on examining the POC of all the reference pictures in L0 and L1 without additional signaling. In another embodiment, it is proposed to add a picture/slice-level flag to indicate whether or not the DMVR parallelism constraint is applied to the current picture/slice.

In some embodiments, the number of segments and the position of each segment inside a picture/slice are selected by the encoder and signaled to the decoder. The signaling may be performed analogously to other parallelism tools in the HEVC and JEM (e.g., slices, tiles and wave-front parallel processing (WPP)). Various selections can lead to different trade-off between coding performance and encoding/decoding parallelism. In one embodiment, it is proposed to set the size of each segment equal to that of one CTU. In terms of signaling, syntax elements may be added at the sequence and/or picture level. For example, the number of CTUs in each segment may be signaled in the Sequence Parameter Set (SPS) and/or the Picture Parameter Set (PPS), or may be signaled in the slice header. Other variations of syntax elements may be used, for example, the number of CTU rows may be used, or the number of segment in each picture/slice may be used, among other alternatives.

Examples of Motion Refinement Methods

Additional embodiments described herein operate to replace the block-matching motion search for calculating the DMVR motion refinement. Compared to a block-matching based method which performs motion search in a small local window, example embodiments directly calculate a motion refinement based on the spatial and temporal sample derivatives. Such embodiments reduce the computational complexity and may increase the motion refinement precision because the value of the derived refined motion is not limited to the search window.

Motion Refinement Using Block-Level BIO.

As discussed above, BIO was used in the JEM to provide sample-wise motion refinement on top of the block-based motion compensated prediction when a block is bi-predicted. Based on the current design, BIO only enhances the motion compensated prediction samples as the outcome of the refinement without updating the MVs that are stored in the MV buffers and used for the spatial and temporal motion prediction and deblocking filter. This means that, as opposed to the current DMVR, BIO does not introduce any encoding/decoding latency between neighboring blocks. However, in the current BIO design, the motion refinement is derived on a small unit (e.g., 4×4). This may incur non-negligible computational complexity, especially at the decoder-side. This is undesirable for hardware codec implementations. Therefore, to address latency of the DMVR while maintaining acceptable coding complexity, it is proposed in some embodiments to use block-based BIO to calculate the local motion refinement for the video blocks that are coded by DMVR. Specifically, in a proposed embodiment, the BIO core design (e.g., the calculation of the gradients and the refined motion vectors) is kept the same as in the existing design to calculate the motion refinement. However, to reduce the complexity, the amount of motion refinement is derived based on CU-level, with a single value being aggregated for all the samples inside a CU and used to calculate a single motion refinement; and all samples inside the current CU will share the same motion refinement. Based on the same notations used above with respect to BIO, an example of a proposed block-level BIO motion refinement is derived as $$(v_x^*, v_y^*) = \underset{(v_x,v_y)}{\mathrm{argmin}} \sum_{(i,j)\in\theta} \Delta^2(i, j) \quad (5)$$

where θ is set of the coordinates of the samples within the current CU, and where Δ(x, y) is an optical flow error metric as set forth in Equation 3, above.

As indicated above, a motivation of BIO is to improve the precision of prediction samples based on the local gradient information at each sample location inside the current block. For large video blocks that contain many samples, it is possible that the local gradient at different sample locations may show quite varying characteristics. In such case, the above block-based BIO derivation may not provide a reliable motion refinement for the current block, therefore leading to coding performance loss. Based on such consideration, in some embodiments, it is proposed to only enable the CU-based BIO motion derivation for the DMVR blocks when its block size is small (e.g., no larger than one given threshold). Otherwise, the CU-based BIO motion derivation is disabled; instead, the existing block-matching based motion refinement (with the proposed DMVR latency removal/reduction methods described above being applied in some embodiments) will be used to derive the local motion refinement for the current block.

Motion Refinement Using Optical Flow.

As noted above, BIO estimates the local motion refinement based on the assumption that the derived L0 and L1 motion refinements at each sample position are symmetric about the current picture, i.e., $v_x^0 = -v_x^1$ and $v_y^0 = -v_y^1$, where $v_x^{0/1}$ and $v_y^{0/1}$ are the horizontal and vertical motion refinement associated with the prediction list L0 and L1. However, such assumption may be not true for the blocks that are coded by the DMVR. For example, in the existing DMVR (as shown in FIG. 8A), two separate block-matching based motion searches are performed for L0 and L1 such that the MVs that minimize the template costs of the L0 and L1 prediction signals may be different. Due to such symmetric motion constraint, the motion refinements derived by the BIO may not always be sufficiently accurate to enhance the prediction quality (sometimes may even degrade the prediction quality) for the DMVR.

In some embodiments, an improved motion derivation method is used to calculate the motion refinement for the DMVR. The classical optical flow model that states that the brightness of a picture keeps constant with the change of time, expressed as follows, $$E(x, y, t) = E(x + dx, y + dy, t + dt) \quad (6)$$

where x and y represent spatial coordinate and t represent time. The right-hand side of the equation can be expanded by Talyor's series about (x, y, t). After that, the optical flow equation becomes, to first order, $$\frac{\partial E(x, y, t)}{\partial t}dt + \frac{\partial E(x, y, t)}{\partial x}dx + \frac{\partial E(x, y, t)}{\partial y}dy = 0 \quad (7)$$

Using a camera's capturing time as the basic unit of time (e.g. setting dt=1), Eq. (7) can be discretized by changing the optical flow function from continuous domain to discrete domain. Let I(x, y) be the sample value captured from camera, then Eq. (7) becomes $$\frac{\partial I(x, y, t)}{\partial t} + \frac{\partial I(x, y, t)}{\partial x}\Delta x + \frac{\partial I(x, y, t)}{\partial y}\Delta y = 0 \quad (8)$$

In various embodiments, one or more error metrics may be defined based on an extent to which the expression on the left in Eq. (9) is not equal to zero. Motion refinements may be employed to substantially minimize the error metric.

In some embodiments, it is proposed to use the discretized optical flow model to estimate the local motion refinements in L0 and L1. Specifically, a bi-prediction template is generated by averaging the two prediction blocks using the initial L0 and L1 MVs of the merge candidate. However, instead of performing block-matching motion search in a local region, the optical flow model in Eq. (8) is used in some proposed embodiments to directly derive the refined MVs for each reference list L0/L1, as depicted as $$G_x^k \Delta x^k + G_y^k \Delta y^k = P^{tmp} - P^k, k = 0, 1 \quad (9)$$

where $P^0$ and $P^1$ are the prediction signals that are generated using the original MVs for the reference list L0 and L1, respectively, $P^{tmp}$ is the bi-prediction template signal; $G_x^0/G_y^0$ and $G_x^1/G_y^1$ are the horizontal/vertical gradients of prediction signals $P^0$ and $P^1$, which can be calculated based on different gradient filters, e.g., the Sobel filter or the 2D separable gradient filters used by BIO, as described in J. Chen, E. Alshina, G. J. Sullivan, J. R. Ohm, J. Boyce, "Algorithm description of joint exploration test model 6", JVET-G1001, July 2017, Torino, Italy. Equation (9) represents a set of equations: one equation for each sample in the prediction signal $P^0$ or $P^1$ for which one individual $G_x^k$, $G_y^k$ and $P^{tmp}-P^k$ can be calculated. With two unknown parameters $\Delta x^k$ and $\Delta y^k$, the overdetermined problem can be solved by minimizing the sum of squared errors of Equation 9 as $$(\Delta x, \Delta y)^*_k = \underset{(\Delta x, \Delta y)}{\mathrm{argmin}} \sum_{(i,j)\in\theta} (G_x^k \Delta x^k + G_y^k \Delta y^k - G_t^k)^2, k = 0, 1 \quad (10)$$

where $G_t^k = P^{tmp} - P^k$ is temporal difference between the L0/L1 prediction signal and the bi-prediction template signal and θ is the set of coordinates within the coding block. By solving the linear least mean squared error (LLMSE) problem in Equation (10), we can obtain the analytical expression of $(\Delta x, \Delta y)^*_k$ as $$\Delta x^*_k = \frac{\sum_{(i,j)}(G_t^k G_x^k)\sum_{(i,j)}(G_y^k)^2 - \sum_{(i,j)}(G_t^k G_y^k)\sum_{(i,j)}(G_x^k G_y^k)}{\sum_{(i,j)}(G_x^k)^2 \sum_{(i,j)}(G_y^k)^2 - \left(\sum_{(i,j)}(G_x^k G_y^k)\right)^2} \quad (11)$$

$$\Delta y^*_k = \frac{\sum_{(i,j)}(G_t^k G_y^k)\sum_{(i,j)}(G_x^k)^2 - \sum_{(i,j)}(G_t^k G_x^k)\sum_{(i,j)}(G_x^k G_y^k)}{\sum_{(i,j)}(G_x^k)^2 \sum_{(i,j)}(G_y^k)^2 - \left(\sum_{(i,j)}(G_x^k G_y^k)\right)^2}$$

-continued $$k = 0, 1$$

Based on Equation (11), in some embodiments, to improve the precision of the derived MVs, such a method may select the motion refinements (i.e., $(\Delta x, \Delta y)*_k$) in a recursive manner. Such embodiments may operate by generating the initial bi-prediction template signal using the original L0 and L1 MVs of the current block and calculating the corresponding delta motion $(\Delta x, \Delta y)*_k$ based on Eq. (11); the refined MVs are then used as the motion to generate the new L0 and L1 prediction samples as well as the bi-prediction template samples, which are then used to update the values of the local refinement $(\Delta x, \Delta y)*_k$. This process may be repeated until the MVs are not updated or the maximum number of iterations is reached. One example of such a process is summarized by the following procedures, as illustrated in FIG. 18.

At 1802, a counter l is initialized to l=0. At 1804, the initial L0 and L1 prediction signals $P_{(l)}^0$ and $P_{(l)}^1$ and the initial bi-prediction template signal $P_l^{tmp}$ are generated using the original MVs $M_{(l)}^0$ and $MV_{(l)}^1$ of the block. The local L0 and L1 motion refinements $\Delta MV_{(l)}^0$, and $\Delta MV_{(l)}^1$ based on Equation (11) at 1806 and 1808, and the MVs of the block are updated as $MV_{(l+1)}^0 = MV_{(l)}^0 + \Delta MV_{(l)}^0$ and $MV_{(l+1)}^1 = MV_{(l)}^1 + \Delta MV_{(l)}^1$.

If $\Delta MV_{(l)}^0$ and $\Delta MV_{(l)}^1$ are zero (determined at 1810) or if $l=l_{max}$ (determined at 1812), then the final bi-prediction may be generated at 1814 using the refined motion vectors. Otherwise, the counter l is incremented at 1816, and the process is iterated, with the L0 and L1 prediction signals $P_{(l+1)}^0$ and $P_{(l+1)}^1$ and the bi-prediction template signal $P_{(l+1)}^{tmp}$ being updated (at 1806, 1808) using the MVs $MV_{(l+1)}^0$ and $MV_{(l+1)}^1$.

Figure 18:
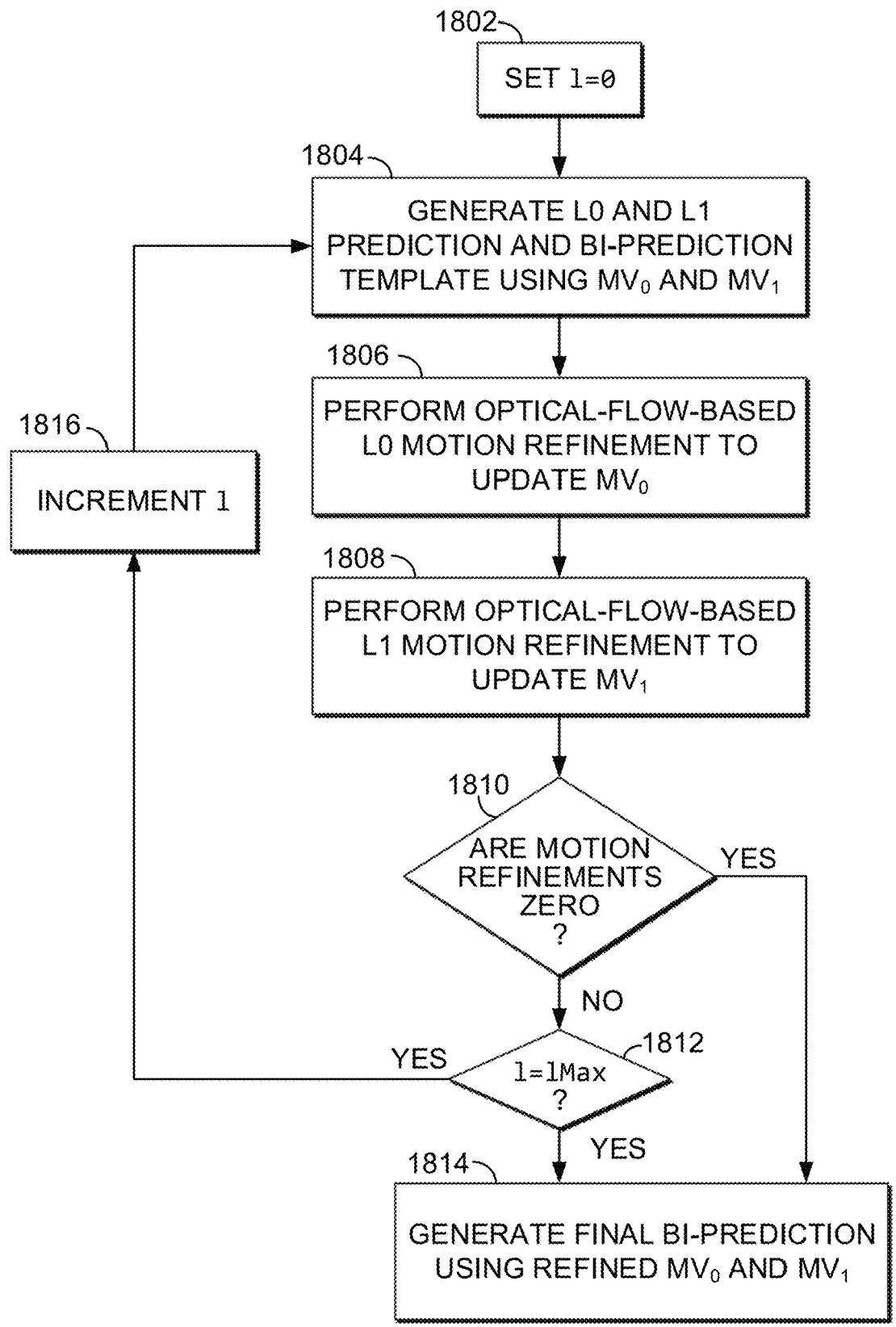
FIG. 18 is a flowchart of a motion refinement process using optical flow according to some embodiments.

FIG. 18 illustrates an example of a DMVR process using an example optical-flow-based motion derivation method for calculating the motion refinements of a DMVR block. As shown in FIG. 18, the optical MVs of one DMVR block is identified by iteratively modifying the original MVs based on the optical flow model. Although such a method can provide good motion estimation accuracy, it also introduces a high amount of complexity increase. To reduce the derivation complexity, in one embodiment of disclosure, it is proposed to only apply one iteration for deriving the motion refinement using the proposed motion derivation method, e.g., to only apply the process illustrated at 1804 through 1808 to derive the modified MVs of a DMVR block.

The optical-flow-based motion derivation model may be more efficient for small CUs than large CUs, due to the high consistency among the samples' characteristics inside a small block. In some embodiments, it is proposed to enable the proposed optical-flow-based motion derivation for the DMVR blocks when its block size is small (e.g., no larger than a given threshold). Otherwise, the existing block-matching based motion refinement will be used to derive the local motion refinement for the current block (e.g. along with the proposed DMVR latency removal/reduction methods described herein).

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding method comprising:
    identifying at least one non-refined motion vector associated with a first block in a picture;
    refining the at least one non-refined motion vector to generate at least one refined motion vector associated with the first block;
    for a second block in the picture neighboring the first block, determining whether the second block is in a different segment of the picture from the first block;
    predicting motion information of the second block, wherein, in response to a determination that the second block is in the same segment of the picture as the first block, the at least one refined motion vector is used as a predictor of the motion information of the second block; and
    predicting the second block based on the predicted motion information.

2. The method of claim 1, further comprising predicting the first block based on the at least one refined motion vector.

3. The method of claim 1, wherein the refining is performed using decoder-side motion vector refinement (DMVR).

4. The method of claim 1, further comprising:
    for a third block in the picture neighboring the first block, determining whether the third block is in a different segment of the picture from the first block;
    predicting motion information of the third block, wherein, in response to a determination that the third block is in a different segment of the picture from the first block, the non-refined motion vector and the refined motion vector are not used as predictors of the motion information of the third block.

5. A video decoding apparatus comprising one or more processors configured to perform at least:
    identifying at least one non-refined motion vector associated with a first block in a picture;

refining the at least one non-refined motion vector to generate at least one refined motion vector associated with the first block;

for a second block in the picture neighboring the first block, determining whether the second block is in a different segment of the picture from the first block;

predicting motion information of the second block, wherein, in response to a determination that the second block is in the same segment of the picture as the first block, the at least one refined motion vector is used as a predictor of the motion information of the second block; and predicting the second block based on the predicted motion information.

6. The apparatus of claim 5, further configured to predict the first block based on the at least one refined motion vector.

7. The apparatus of claim 5, wherein the second block is predicted using bi-prediction.

8. The apparatus of claim 5, further configured to perform:

for a third block in the picture neighboring the first block, determining whether the third block is in a different segment of the picture from the first block;

predicting motion information of the third block, wherein, in response to a determination that the third block is in a different segment of the picture from the first block, the non-refined motion vector and the refined motion vector are not used as predictors of the motion information of the third block.

9. A video encoding method comprising:

identifying at least one non-refined motion vector associated with a first block in a picture;

refining the at least one non-refined motion vector to generate at least one refined motion vector associated with the first block;

for a second block in the picture neighboring the first block, determining whether the second block is in a different segment of the picture from the first block;

predicting motion information of the second block, wherein, in response to a determination that the second block is in the same segment of the picture as the first block, the at least one refined motion vector is used as a predictor of the motion information of the second block; and predicting the second block based on the predicted motion information.

10. The method of claim 9, further comprising predicting the first block based on the at least one refined motion vector.

11. The method of claim 9, further comprising signaling in a bitstream information indicating an arrangement of segments in the picture.

12. The method of claim 9, further comprising:

for a third block in the picture neighboring the first block, determining whether the third block is in a different segment of the picture from the first block;

predicting motion information of the third block, wherein, in response to a determination that the third block is in a different segment of the picture from the first block, the non-refined motion vector and the refined motion vector are not used as predictors of the motion information of the third block.

13. A video encoding apparatus comprising one or more processors configured to perform at least:

identifying at least one non-refined motion vector associated with a first block in a picture;

refining the at least one non-refined motion vector to generate at least one refined motion vector associated with the first block;

for a second block in the picture neighboring the first block, determining whether the second block is in a different segment of the picture from the first block;

predicting motion information of the second block, wherein, in response to a determination that the second block is in the same segment of the picture as the first block, the at least one refined motion vector is used as a predictor of the motion information of the second block; and predicting the second block based on the predicted motion information.

14. The apparatus of claim 13, further configured to predict the first block based on the at least one refined motion vector.

15. The apparatus of claim 13, further comprising signaling in a bitstream an index associated with the second block, the index indicating that the motion information of the second block is predicted based on the first block.

16. The apparatus of claim 13, further configured to perform:

for a third block in the picture neighboring the first block, determining whether the third block is in a different segment of the picture from the first block;

predicting motion information of the third block, wherein, in response to a determination that the third block is in a different segment of the picture from the first block, the non-refined motion vector and the refined motion vector are not used as predictors of the motion information of the third block.

* * * * *